(12) United States Patent  
Kitamura et al.

(10) Patent No.: US 7,580,187 B2
(45) Date of Patent: Aug. 25, 2009

(54) DIFFRACTIVE OPTICAL ELEMENT AND OPTICAL LOW-PASS FILTER UTILIZING THE SAME

(75) Inventors: Mitsuru Kitamura, Tokyo (JP); Akiko Tanaka, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 103 days.

(21) Appl. No.: 11/629,857

(22) PCT Filed: Jun. 16, 2005

(86) PCT No.: PCT/JP2005/011481

§ 371 (c)(1),
(2), (4) Date: Dec. 18, 2005

(87) PCT Pub. No.: WO2005/124403

PCT Pub. Date: Dec. 29, 2005

(65) Prior Publication Data

US 2008/0037126 A1    Feb. 14, 2008

(30) Foreign Application Priority Data

Jun. 18, 2004 (JP) ............................. 2004-180567
Mar. 30, 2005 (JP) ............................. 2005-097890

(51) Int. Cl.
*G02B 27/44* (2006.01)
*G01F 9/00* (2006.01)

(52) U.S. Cl. ........................ 359/565; 359/566; 359/569; 430/5

(58) Field of Classification Search ................. 359/565, 359/569, 566, 567, 576; 430/5
See application file for complete search history.

(56) References Cited

U.S. PATENT DOCUMENTS

| | | | |
|---|---|---|---|
| 3,829,193 A * | 8/1974 | Tsunoda et al. | 359/29 |
| 5,262,893 A * | 11/1993 | Shrauger et al. | 359/565 |
| 5,467,224 A | 11/1995 | Ohnishi et al. | |
| 7,056,626 B2 * | 6/2006 | Taniguchi et al. | 430/5 |

FOREIGN PATENT DOCUMENTS

| | | | |
|---|---|---|---|
| JP | 63-161425 A | 7/1988 |
| JP | 6-82726 A | 3/1994 |
| JP | 2001-42114 A | 2/2001 |
| JP | 2001-74921 A | 3/2001 |
| JP | 2001-133616 A | 5/2001 |
| JP | 2001-356673 A | 12/2001 |

* cited by examiner

*Primary Examiner*—Audrey Y Chang
(74) *Attorney, Agent, or Firm*—Sughrue Mion, PLLC

(57) ABSTRACT

The invention provides a diffractive optical element that can be used as a light beam splitter device, an optical low-pass filter or the like having a two-dimensionally multi-valued fine periodic structure. The surface of a transparent substrate for the diffractive optical element is divided into fine rectangular areas of identical shape which line up in two orthogonal directions while a plurality of rows line up with ends in alignment in any one of the directions. With respect to standard wavelength light incident vertically on the surface of the transparent substrate, an l-th, and a (l+1)-th rectangular area in an l-th row, where l is an odd number, gives a phase $2p\pi$, and a phase $\{(4q+1)\pi/2+\delta\pi/2\}$, respectively, and an l-th, and a (l+1)-th rectangular area in a (l+1)-th row gives a phase $\{(4r+3)\pi/2+3\delta\pi/2\}$, and a phase $\{(4s+2)\pi/2+\delta\pi\}$, respectively. However, $-0.25 \leq \delta \leq 0.25$, and p, q, r, and s is an integer.

7 Claims, 12 Drawing Sheets (a)

(b)

(a)

(b)

(c)

DIFFRACTIVE OPTICAL ELEMENT AND OPTICAL LOW-PASS FILTER UTILIZING THE SAME

ART FIELD

The present invention relates generally to a diffractive optical element, and more particularly to a diffractive optical element that can be used as an optical element using the same, for instance, a light beam splitter device and an optical low-pass filter using the same.

ART FIELD

The applicant has already put forward Japanese Patent Application No. 2003-311036 to come up with a diffractive optical element comprising a grid pattern of square area groups, wherein adjoining square areas have a phase difference of about $\pi$ with respect to standard wavelength light, and an almost vertically incident light beam is split into four or five light beams.

In this conjunction, it is well known from Patent Publications 1 to 8 or the like that an optical low-pass filter of the diffractive optical element type is used with an image-formation system using a solid-state imaging device having a discrete pixel structure as represented by a CCD or CMOS array for the purpose of holding back the occurrence of moiré fringes or false colors caused by high-frequency components contained in a subject.

Patent Publication 1
JP(A) 53-119063
Patent Publication 2
JP(A) 5-2151
Patent Publication 3
JP(A) 5-181093
Patent Publication 4
JP(A) 5-66370
Patent Publication 5
JP(A) 2000-66142
Patent Publication 6
JP(A) 2002-156608
Patent Publication 7
JP(B) 52-22247
Patent Publication 8
JP(A) 8-15646
Patent Publication 9
JP(A) 10-54960
Patent Publication 10
JP(A) 2001-356673

The aforesaid prior diffractive optical elements are all of rectangular, triangular, trapezoid or sine wave forms in the section of their phase grating portion. In other words, none of them are a binary optical element with a two-dimensionally multi-valued phase difference portion.

DISCLOSURE OF THE INVENTION

In view of such situations with the prior art as described above, an object of the present invention is to provide a diffractive optical element that can be used typically as a light beam splitter device or optical low-pass filter having a two-dimensionally multi-valued fine period structure.

According to the present invention, the above object is achievable by the provision of a diffractive optical element comprising a transparent substrate, characterized in that a surface of said transparent substrate is divided into fine rectangular areas of identical shape which line up in two orthogonal directions while a plurality of rows line up with ends in alignment in any one of said directions, wherein, with respect to standard wavelength light incident vertically on the surface of said transparent substrate, an l-th, and a (l+1)-th rectangular area in an l-th row, where l is an odd number, gives a phase $2p\pi$, and a phase $\{(4q+1)\pi/2+\delta\pi/2\}$, respectively, and an l-th, and a (l+1)-th rectangular area in a (l+1)-th row gives a phase $\{(4r+3)\pi/2+3\ \delta\pi/2\}$, and a phase $\{(4s+2)\pi/2+\delta\pi\}$, respectively, provided that $-0.25 \leq \delta \leq 0.25$, and p, q, r, and s is an integer.

Preferably in this case, the rectangular areas comprise square areas of identical shape.

The present invention also provides a diffractive optical element comprising a transparent substrate, wherein a surface of said transparent substrate is divided into fine rectangular areas of identical shape which line up in two orthogonal directions while a plurality of rows line up with ends in alignment in any one of said directions, wherein, with respect to standard wavelength light incident vertically on the surface of said transparent substrate, an l-th, and a (l+1)-th rectangular area in an l-th row, where n is an odd number, gives a phase $2p\pi$, and a phase $\{(4q+1)\pi/2+\delta\pi/2\}$, respectively, and an l-th, and a (l+1)-th rectangular area in a (l+1)-th row gives a phase $\{(4r+3)\pi/2+3\ \delta\pi/2\}$, and a phase $\{(4s+2)\pi/2+\delta\pi\}$, respectively, provided that $-0.25 \leq \delta \leq 0.25$, and p, q, r, and s is an integer, characterized in that:

each rectangular area has intermediate areas set at sides between rectangular areas adjacent thereto in row and column directions while intervening in both directions orthogonal to the respective sides with an invariable vertex, wherein each rectangular area is deformed by an intervening intermediate area from a rectangle, and given to each intermediate area is a phase having a value that is a substantially intermediate value of a value at which phases of areas on both its sides are converted to a value of $\{(0 \text{ to } 2\pi) \text{ or } (0 \text{ to } 2\pi+2n\pi)\}+\pi$, provided that when the value at which the phases of areas on both its sides are converted to a value of 0 to $2\pi$ has a difference exceeding $\pi$, each intermediate area is provided with a phase having a value that is a substantially intermediate value of the value at which the phases of areas on both its sides are converted to a value of $\{(0 \text{ to } 2\pi) \text{ or } (0 \text{ to } 2\pi+2n\pi)\}+\pi$.

Preferably in this case, the rectangular areas before deformed by the intervening intermediate areas comprise square areas.

Preferably, the boundary line of each intermediate area comprises a smooth curved line, for instance, a sine wave line.

The diffractive optical element of the invention may be used as a light beam splitter device adapted to split a light beam incident vertically on the transparent substrate into four or five light beams, and as an optical low-pass filter adapted to allow mutually displaced identical images to be incident on an imaging plane in a superposed way.

Further, the present invention includes the provision of a diffractive optical element fabrication process for fabrication of such diffractive optical elements as described above, characterized in that n-th power-of-2 levels of relief patterns are formed by photo-etching on a substrate, where n is a natural number of 2 or greater, thereby obtaining a relief pattern die, and said relief pattern die is then pressed onto a resin layer to form a relief pattern for a diffractive optical element on the surface of said resin layer. Note here that the aforesaid n-th power-of-2 levels of relief patterns are usually such that each is set equally.

BRIEF EXPLANATION OF THE DRAWINGS

FIG. 3(a) is a side view and FIG. 3(b) is illustrative of how a light beam is separated on an imaging plane.

BEST MODE FOR CARRYING OUT THE INVENTION

Figure 1:
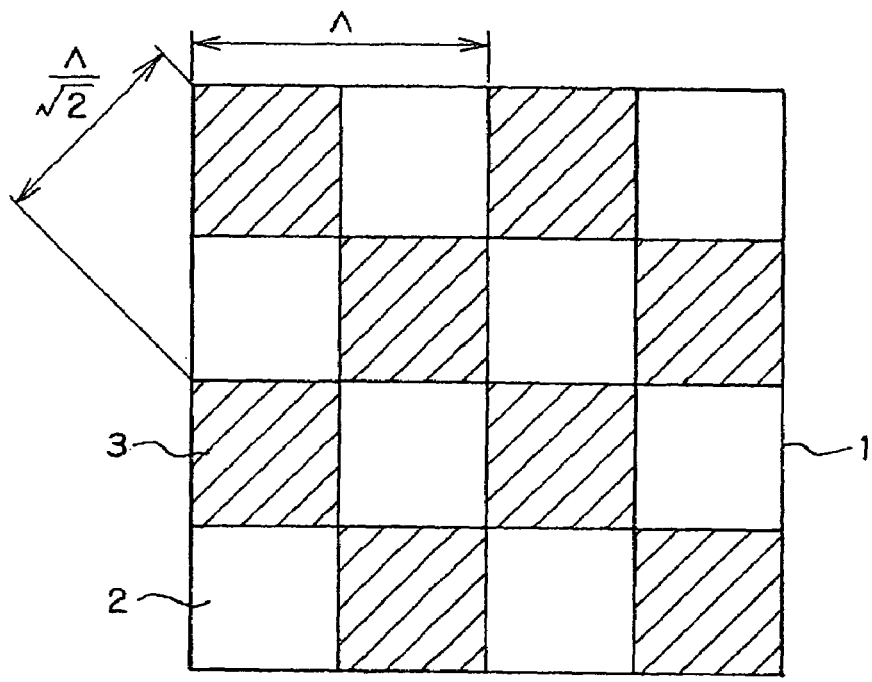
FIGS. 1(a) and 1(b) are a plane view and a perspective view, respectively, of a diffractive optical element having a two-dimensionally two-valued fine period structure, which underlies the diffractive optical element of the invention.
Figure 1:
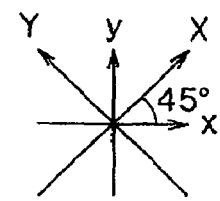
Figure 1:
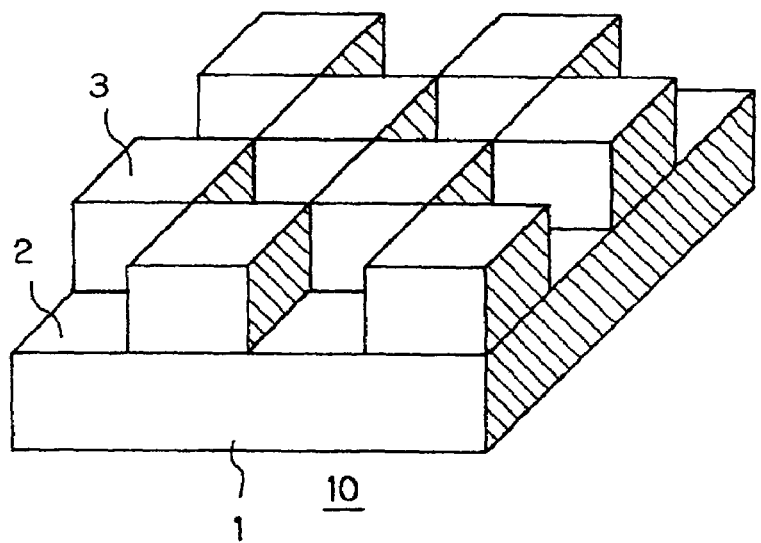

First of all, the fundamental principles of the diffractive optical element of the invention are explained.

FIGS. 1(a) and 1(b) are a plane view and a perspective view, respectively, of a diffractive optical element 10 having a two-dimensionally two-valued fine period structure, which underlies the diffractive optical element proposed in Japanese Patent Application No. 2003-311036. Referring to the diffractive optical element 10 here, two orthogonal axes x, y are set on the surface of a transparent substrate 1. Fine square areas 2, 3 of the same shape line up in a grid pattern in alignment with both the x- and y-axis directions. That is, the square areas 2 and 3 imparting a phase 0 and a phase π, respectively, to light of a standard wavelength $\lambda_0$ incident vertically on the transparent substrate 1 line up alternately in both the x- and y-axis directions. Here mutually orthogonal diagonal directions set at angles of 45° and 135° between the x-axis and the y-axis are called the X-axis and the Y-axis, respectively. The square areas 2 and 3 are located such that the square areas 2 giving rise to the phase 0 and the square areas 3 giving rise to the phase π line up in both the X- and Y-axis directions. That is, the arrangement of the square areas 2 and 3 takes on the so-called checkered pattern. Here, if Λ is indicative of the repetitive pitch of the square areas 2 or 3 in the x- and y-axis directions, then the repetitive pitch of the square areas 2 or 3 in the diagonal X- and Y-axis directions becomes $\Lambda/\sqrt{2}$. For instance, when Λ=4 μm, the diagonal (X- and Y-axis) repetitive pitch comes to be $\Lambda/\sqrt{2}=4/\sqrt{2}$ μm=$2\sqrt{2}$ μm. Note here that the standard wavelength $\lambda_0$ is assumed to be equal to 800 nm.

Figure 2:
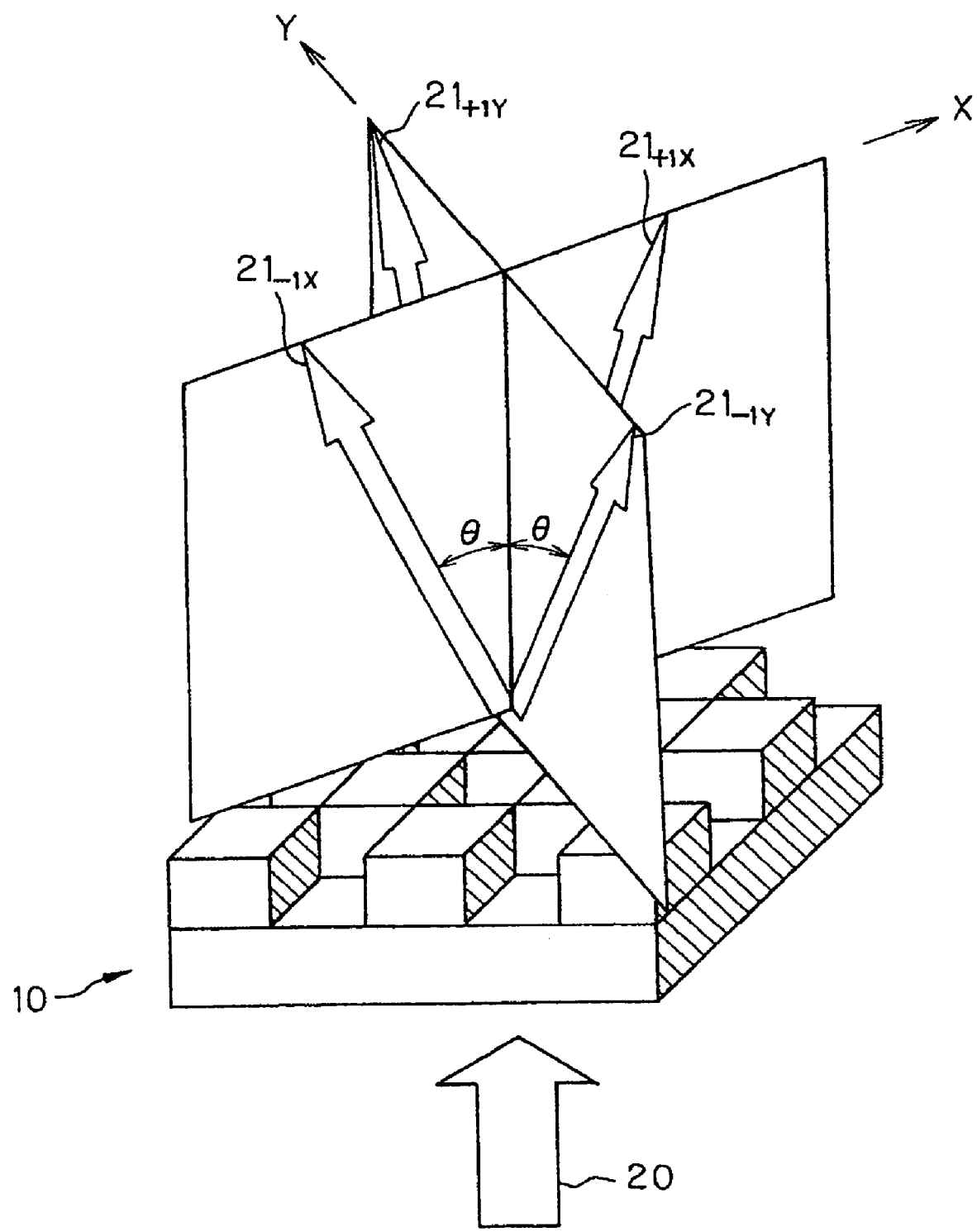
FIG. 2 is illustrative of how incident light is split into four diffracted light beams by a diffractive optical element that underlies the diffractive optical element of the invention.

As light 20 of the standard wavelength $\lambda_0$ is let be incident vertically on the transparent substrate 1 of the diffractive optical element having such construction, four diffracted light beams $21_{+1X}$, $21_{-1X}$, $21_{+1Y}$ and $21_{-1Y}$ leave in the opposite direction, as can be seen from FIG. 2. However, it is noted that the diffraction direction lies in the orthogonally diagonal X- and Y-axis directions, rather than in the orthogonal two x- and y-axis directions; there are +first-order light $21_{+1X}$, $21_{+1Y}$ and −first-order light $21_{-1X}$, $21_{-1Y}$. The diffractive equation shows that the angle of diffraction θ with respect to a normal to the transparent substrate 1 of the diffractive optical element 10 has a relation $\theta=\arcsin\{\lambda_0/(\Lambda/\sqrt{2})\}$ to four such diffracted light $21_{+1X}$, $21_{-1X}$, $21_{+1Y}$ and $21_{-1Y}$. When $\lambda_0$=0.8 μm in the aforesaid numerical example, θ=16.43°. As a matter of course, the +first-order light and the −first-order light in both the X- and Y-axis directions have opposite signs with respect to θ.

A possible reason why diffracted light leaves in the orthogonally diagonal X- and Y-axis directions could be that a linear area (one-dimensional phase diffraction grating) with the square area 2 giving rise to the phase 0 and the square area 3 giving rise to the phase π continuously linked together appears repetitively in the diagonal X- and Y-axis directions. A reason why there is no zero-order diffracted light is that all over the surface of the diffractive optical element 10 the area of the square areas 2 giving rise to the phase 0 is equal to the area of the square areas 3 giving rise to the phase π, so that at a position far away from the diffractive optical element 10, a component that transmits through the square area 2 without being diffracted is canceled out by a component that transmits through the square area 3 without being diffracted. Higher-order light of the odd-number order, too, is slightly diffracted (there is no diffracted light of the even-number order); in a normal state of use, however, such diffracted light is negligible, because of being relatively weaker than the +first-order light $21_{+1X}$, $21_{+1Y}$ and the −first-order light $21_{-1X}$, $21_{-1Y}$, as can be seen from Table 1.

Table 1, given just below, are indicative of the intensity of each diffraction order of the diffractive optical element 10 with a two-valued phase modulation quantity. Table 1 is provided with the X-axis direction as abscissa and the Y-axis direction as ordinate, and with the respective numerals indicative of an order. The standard wavelength is supposed to be $\lambda_0$=532 nm, and the wavelength λ used is assumed to be 532 nm too. The aforesaid four diffracted light $21_{+1X}$, $21_{-1X}$, $21_{+1Y}$ and $21_{-1Y}$ are corresponding to the (+1, 0) order, (−1, 0) order, (0, +1) order and (0, −1) order, respectively; if the intensity of incident light 20 is 100%, there is then 16.4% obtained. In Table 1 and throughout the disclosure, "E-0n" where n is 0 or a positive integer means×$10^{-n}$. As can be appreciated from Table 1, the diffraction efficiency of the +first-order light $21_{+1X}$, $21_{+1Y}$ and the −first-order light $21_{-1X}$, $21_{-1Y}$ becomes 65.6%, and the diffraction efficiency of diffracted light of other orders (noise light) becomes 34.4%, with an SN ratio of 1.94.

TABLE 1

Diffraction efficiency

| Degree | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| -8 | 0.00E+00 | 7.42E-04 | 0.00E+00 | 1.10E-04 | 0.00E+00 | 5.58E-05 | 0.00E+00 | 4.25E-05 | 0.00E+00 | 4.25E-05 | 0.00E+00 | 5.56E-05 | 0.00E+00 | 1.10E-04 | 0.00E+00 | 7.42E-04 | 0.00E+00 |
| -7 | 7.35E-04 | 0.00E+00 | 9.84E-04 | 0.00E+00 | 1.53E-04 | 0.00E+00 | 8.27E-05 | 0.00E+00 | 6.98E-05 | 0.00E+00 | 8.27E-05 | 0.00E+00 | 1.53E-04 | 0.00E+00 | 9.84E-04 | 0.00E+00 | 7.35E-04 |
| -6 | 0.00E+00 | 9.76E-04 | 0.00E+00 | 1.37E-03 | 0.00E+00 | 2.28E-04 | 0.00E+00 | 1.36E-04 | 0.00E+00 | 1.36E-04 | 0.00E+00 | 2.28E-04 | 0.00E+00 | 1.37E-03 | 0.00E+00 | 9.76E-04 | 0.00E+00 |
| -5 | 1.08E-04 | 0.00E+00 | 1.36E-03 | 0.00E+00 | 2.04E-03 | 0.00E+00 | 3.76E-04 | 0.00E+00 | 2.65E-04 | 0.00E+00 | 3.76E-04 | 0.00E+00 | 2.04E-03 | 0.00E+00 | 1.36E-03 | 0.00E+00 | 1.08E-04 |
| -4 | 0.00E+00 | 1.50E-04 | 0.00E+00 | 2.03E-03 | 0.00E+00 | 3.37E-03 | 0.00E+00 | 7.35E-04 | 0.00E+00 | 7.35E-04 | 0.00E+00 | 3.37E-03 | 0.00E+00 | 2.03E-03 | 0.00E+00 | 1.50E-04 | 0.00E+00 |
| -3 | 5.38E-05 | 0.00E+00 | 2.24E-04 | 0.00E+00 | 3.35E-03 | 0.00E+00 | 6.57E-03 | 0.00E+00 | 2.04E-03 | 0.00E+00 | 6.59E-03 | 0.00E+00 | 3.35E-03 | 0.00E+00 | 2.24E-04 | 0.00E+00 | 5.38E-05 |
| -2 | 0.00E+00 | 8.04E-05 | 0.00E+00 | 3.71E-04 | 0.00E+00 | 6.57E-03 | 0.00E+00 | 1.83E-02 | 0.00E+00 | 1.83E-00 | 0.00E+00 | 6.57E-03 | 0.00E+00 | 3.71E-04 | 0.00E+00 | 8.04E-05 | 0.00E+00 |
| -1 | 4.09E-05 | 0.00E+00 | 1.33E-04 | 0.00E+00 | 7.28E-04 | 0.00E+00 | 1.82E-02 | 0.00E+00 | 1.64E-01 | 0.00E+00 | 1.82E-02 | 0.00E+00 | 7.28E-04 | 0.00E+00 | 1.33E-04 | 0.00E+00 | 4.09E-05 |
| 0 | 0.00E+00 | 6.77E-05 | 0.00E+00 | 2.61E-04 | 0.00E+00 | 2.02E-03 | 0.00E+00 | 1.64E-01 | 3.75E-33 | 1.64E-01 | 0.00E+00 | 2.02E-03 | 0.00E+00 | 2.61E-04 | 0.00E+00 | 6.77E-05 | 0.00E+00 |
| 1 | 4.09E-05 | 0.00E+00 | 1.33E-04 | 0.00E+00 | 7.28E-04 | 0.00E+00 | 1.82E-02 | 0.00E+00 | 1.64E-01 | 0.00E+00 | 1.82E-02 | 0.00E+00 | 7.28E-04 | 0.00E+00 | 1.33E-04 | 0.00E+00 | 4.09E-05 |
| 2 | 0.00E+00 | 8.04E-05 | 0.00E+00 | 3.71E-04 | 0.00E+00 | 6.57E-03 | 0.00E+00 | 1.83E-02 | 0.00E+00 | 1.83E-02 | 0.00E+00 | 6.57E-03 | 0.00E+00 | 3.71E-04 | 0.00E+00 | 8.04E-05 | 0.00E+00 |
| 3 | 5.38E-05 | 0.00E+00 | 2.24E-04 | 0.00E+00 | 3.35E-03 | 0.00E+00 | 6.59E-03 | 0.00E+00 | 2.04E-03 | 0.00E+00 | 6.59E-03 | 0.00E+00 | 3.35E-03 | 0.00E+00 | 2.24E-04 | 0.00E+00 | 5.38E-05 |
| 4 | 0.00E+00 | 1.50E-04 | 0.00E+00 | 2.03E-03 | 0.00E+00 | 3.37E-03 | 0.00E+00 | 7.35E-04 | 0.00E+00 | 7.35E-04 | 0.00E+00 | 3.37E-03 | 0.00E+00 | 2.03E-03 | 0.00E+00 | 1.50E-04 | 0.00E+00 |
| 5 | 1.08E-04 | 0.00E+00 | 1.36E-03 | 0.00E+00 | 2.04E-03 | 0.00E+00 | 3.76E-04 | 0.00E+00 | 2.65E-04 | 0.00E+00 | 3.76E-04 | 0.00E+00 | 2.04E-03 | 0.00E+00 | 1.36E-03 | 0.00E+00 | 1.08E-04 |
| 6 | 0.00E+00 | 9.76E-04 | 0.00E+00 | 1.37E-03 | 0.00E+00 | 2.28E-04 | 0.00E+00 | 1.36E-04 | 0.00E+00 | 1.36E-04 | 0.00E+00 | 2.28E-04 | 0.00E+00 | 1.37E-03 | 0.00E+00 | 9.76E-04 | 0.00E+00 |
| 7 | 7.35E-04 | 0.00E+00 | 9.84E-04 | 0.00E+00 | 1.53E-04 | 0.00E+00 | 8.27E-05 | 0.00E+00 | 6.98E-05 | 0.00E+00 | 8.27E-05 | 0.00E+00 | 1.53E-04 | 0.00E+00 | 9.84E-04 | 0.00E+00 | 7.35E-04 |
| 8 | 0.00E+00 | 7.42E-04 | 0.00E+00 | 1.10E-04 | 0.00E+00 | 5.58E-05 | 0.00E+00 | 4.25E-05 | 0.00E+00 | 4.25E-05 | 0.00E+00 | 5.56E-05 | 0.00E+00 | 1.10E-04 | 0.00E+00 | 7.42E-04 | 0.00E+00 |

The diffractive optical element 10 having such construction as depicted in FIG. 1 could be embodied as a light beam splitter device adapted to split incident light 20 uniformly into four diffracted light $21_{+1X}$, $21_{-1X}$, $21_{+1Y}$ and $21_{-1Y}$. Alternatively, if the phase given by the square area 3 is shifted somewhat from π, that diffractive optical element 10 could be used as a light beam splitter device adapted to split incident light 20 almost uniformly into five light beams, because the intensity of the zero-order diffracted light can be almost equal to that of the +first-order light $21_{+1X}$, $21_{+1Y}$ and the -first-order light $21_{-1X}$, $21_{-1Y}$. Such a light beam splitter device, for instance, could be used for tracking control for the read head of an optical recording medium with information recorded along a concentric or spiral track, or for the generation of a sensor signal for the tracking position of the read head of an optical recording medium with information recorded along a concentric or spiral track (for details, see Japanese Patent Application No. 2003-311036).

Further, such a light beam splitter device adapted to split incident light 20 almost uniformly into four or five light beams could be used as an optical low-pass filter for an imaging optical system using a solid-state imaging device having a discrete pixel structure as represented by a CCD or CMOS array. FIG. 3(a) is a side view, and FIG. 3(b) is illustrative of how incident light is split on an imaging plane into light beams. As shown, a light ray 20 converted such that it forms an image on an imaging plane 12 of CCD 11 by means of an image-formation optical system not shown (an objective optical system) passes through the diffractive optical element 10 that forms an optical low-pass filter located between the image-formation optical system and the imaging plane 12 of CCD 11, where it is split into four image-formation light rays $21_{+1X}$, $21_{-1X}$, $21_{+1Y}$ and $21_{-1Y}$ for incidence onto the imaging plane 12 of CCD 11 with a separation distance δ in the x- and y-axis directions. And then, each image-formation light ray $21_{+1X}$, $21_{-1X}$, $21_{+1Y}$, $21_{-1Y}$ forms the image of a subject on the imaging plane 12 of CCD 11. As a result, four identical images mutually displaced by the distance δ in the x- and y-axis directions are formed on the imaging plane 12 in a superposed way. For this reason, the images formed on the imaging plane 12 in the superposed way become blurred, resulting in an image that gets rid of high-frequency components of spatial frequency (Patent Publication 9).

In one specific example where the pixel pitch of CCD 11 in the x- and y-axis directions is 3.00 μm, the aforesaid displacement distance δ is typically again set to 3.00 μm, although of course it may be less than that Consider here the case where a glass sheet 13 having a refractive index of 1.50 and a thickness of 0.5 mm is located on the back surface of the diffractive optical element (optical low-pass filter) 10 (that lies on an imaging plane side 12) with the distance from the back surface of that glass sheet 13 to the imaging plane 12 set to 1.0 mm and the wavelength set to $\lambda$=532 nm. Then, to obtain such a displacement distance $\delta$, the aforesaid angle of diffraction $\theta$ should be 0.09116°, and the repetitive pitch $\Lambda/\sqrt{2}$ of the square area 2 or 3 in the X- and Y-axis directions of the diffractive optical element (optical low-pass filter) 10 should be 334.4 µm while the repetitive pitch $\Lambda$ of the square area 2 or 3 in the x- and y-axis directions should be 472.9 µm.

In the aforesaid example, the diffractive optical element 10 adapted to split incident light 20 almost uniformly into four light beams is going to be used as an optical low-pass filter. It is understood, however, that even the diffractive optical element adapted to split incident light 20 almost uniformly into five light beams, too, could be used as an optical low-pass filter.

With a light beam splitter device with the phase modulation quantity comprising two values of 0 and $\pi$ as shown in FIG. 1, the diffraction efficiency for the whole effective light beams $21_{+1X}$, $21_{-1X}$, $21_{+1Y}$, $21_{-1Y}$ is about 65.6%, and the diffraction efficiency for unnecessary noise light is as relatively high as about 34.4%.

Therefore, consider here what happens at the time when the diffractive optical element 10 with the phase modulation quantity having two values as shown in FIG. 1 is modified or otherwise configured as one with the phase modulation quantity having four or more values, thereby achieving much higher diffraction efficiency.

Figure 4:
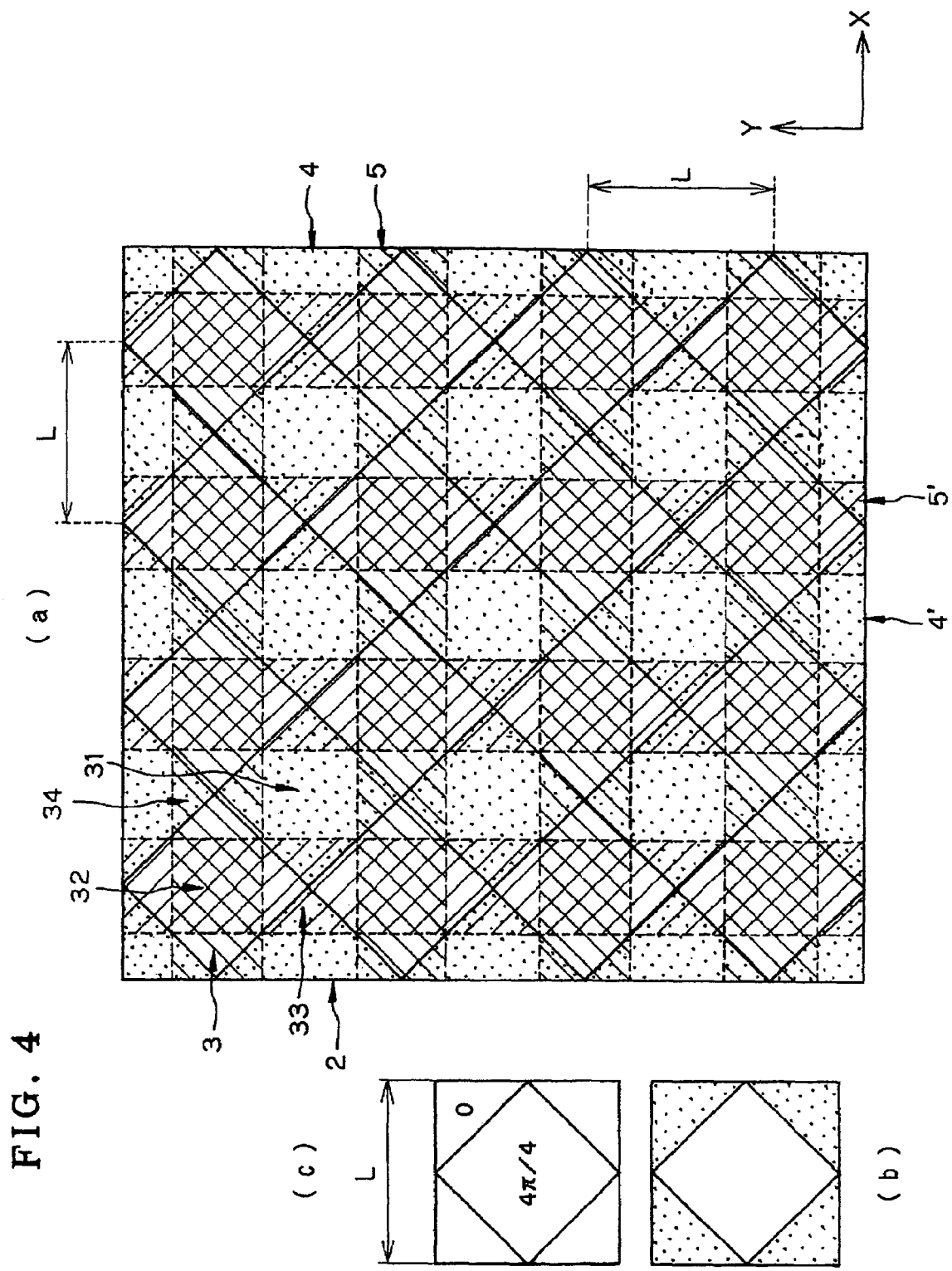
FIG. 4(a) is a plane view of such a diffractive optical element as shown in FIG. 1, with the diagonal directions of square areas lying in the lateral and longitudinal directions.
FIG. 4(b) is illustrative of its basic pattern.
FIG. 4(c) is illustrative of the phase distribution of that basic pattern.

FIG. 4(a) is a plane view of a diffractive optical element 10 wherein square areas 2, each giving a phase 0 to light of standard wavelength $\lambda_0$, and square areas 3, each giving a phase $\pi$ to it, as shown in FIG. 1, take on the so-called checkered pattern, and the diagonals of the square areas 2, 3 are located in such a way as to lie in the lateral (X-axis) and longitudinal (Y-axis) directions. Specifically, 4×4 such basic patterns as shown in FIG. 4(b) are located laterally and longitudinally, and each basic pattern has such a phase distribution as shown in FIG. 4(c).

In such arrangement, linear areas 4 and 5 with the square areas 2 giving rise to the phase 0 and the square areas 3 giving rise to the phase $\pi$ continuously linked together in the lateral (X-axis) direction line up alternately in the longitudinal direction with the same width (L/2), and linear areas 4' and 5' with the square areas 2 giving rise to the phase 0 and the square areas 3 giving rise to the phase $\pi$ continuously linked together in the longitudinal (Y-axis) direction line up alternately in the lateral direction with the same width (L/2). In conjunction with FIG. 1, L is supposed to be L=$\Lambda/\sqrt{2}$. The linear areas 4 and 5 would define a one-dimensional phase diffraction grating with the grating lying laterally, and the linear areas 4' and 5' would define a one-dimensional phase diffraction grating with the grating lying longitudinally. An area at which the linear areas 4 and 4' giving rise to the phase 0 intersect defines a smaller square area 31 where the diagonals in the square area 2 are mutually at angles of 45°, and an area at which the linear areas 5 and 5' giving rise to the phase $\pi$ intersect defines a smaller square area 32 where the diagonals in the square area 3 are mutually at angles of 45°. As the element having a two-valued phase modulation quantity is changed to one having a four-valued phase modulation quantity, it causes the square areas 31 and 32 to overlap all the areas 2 and 3 having the original phases 0 and $\pi$; they remain with the phases 0 and $\pi$.

For instance, consider here the laterally extending linear area 4. Between one square area 31 and the adjacent square area 31, there is a square area 33 of similar size. In this area, the area 2 with the original phase 0 and the area 3 with the original phase $\pi$ coexist evenly, and on both its sides there are the square areas 31 with the phase 0 adjoining. It is thus sensible to allocate a phase $\pi/2$ (=$2\pi/4$) to that square area 33. If the phase $\pi/2$ (=$2\pi/4$) is allocated to the square area 33 between the square areas 31 in the laterally extending area 4, it would seem reasonable to allocate the phase $\pi/2$ (=$2\pi/4$) to the square area 34 between the square areas 31 in the longitudinally extending area 4' too. However, as $\pi/2$ (=$2\pi/4$) is given to this area too, the area of the areas giving rise to the phase $\pi/2$ (=$2\pi/4$) all over the surface of the diffractive optical element 10 becomes half the whole area, and at a position far away from the diffractive optical element 10, there is no transmissive area that cancels out a component that transmits through the area giving rise to the phase $\pi/2$ (=$2\pi/4$) without being diffracted. Therefore, there must be a tweak. The phase 0 of the square area 2 having the phase 0 and adjoining to the square area 34 between the square areas 31 in the longitudinally extending linear area 4' is equivalent to $2\pi$. Accordingly, the average of phases at the square area 34 becomes ($\pi+2\pi$)/2=$3\pi/2$. This $3\pi/2$ is allocated to the square area 34. As the area 31 having the phase 0 and the area 34 having the phase $3\pi/2$ line up alternately along the longitudinally extending linear area 4', there would seem to be too large a phase gap. However, the phase $3\pi/2$ is equivalent to a phase $-\pi/2$, and so there is a phase difference of $\pi/2$ between the areas 31 and 34, which is equal to a phase difference of $\pi/2$ between the areas 31 and 33 in the laterally extending linear area 4; there is no anything unreasonable.

From the foregoing considerations, it is understood that the same also holds for when the phases of $3\pi/2$ and $\pi/2$ are allocated to the square areas 33 and 34, respectively.

FIG. 5(a) is a plane view of the diffractive optical element 10 with a four-valued phase modulation quantity, wherein the square areas 31 to 34 are sectioned off and specific phases are assigned to such areas 31 to 34, as mentioned above; FIG. 5(b) is illustrative of its basic pattern; and FIG. 5(c) is illustrative of the phase distribution of that basic pattern. The diffractive optical element 10 is made up by arranging 4×4 such basic patterns longitudinally and laterally. Table 2, just given below, shows the intensity of each diffraction order of the diffractive optical element 10 having a four-valued phase modulation quantity, with the X-axis direction as abscissa, the Y-axis direction as ordinate, and each numeral indicative of an order. Assume here that the standard wavelength is $\lambda_0$=532 nm, the wavelength used is likewise $\lambda$=532 nm, and the repetitive pitch of square areas 31 to 34 in the X- and Y-axis directions of the diffractive optical element 10 is L=334.4 µm. Four diffracted light $21_{+1X}$, $21_{-1X}$, $21_{+1Y}$ and $21_{-1Y}$ of FIG. 1 are corresponding to the (+1, 0) order, (−1, 0) order, (0, +1) order and (0, −1) order, respectively. If the intensity of incident light 20 is 100%, then there is 20.3%. From Table 2, the diffraction efficiency for the +first-order light $21_{+1X}$, $21_{+1Y}$, and the −first-order light $21_{-1X}$, $21_{-1Y}$ is found to be 81.2%, and the diffraction efficient for diffracted (noise) light of other orders is found to be 18.8%, with an SN ratio of 4.32.

TABLE 2

| | Diffraction efficiency | | | | | | | | | |
|---|---|---|---|---|---|---|---|---|---|---|
| Degree | −8 | −7 | −6 | −5 | −4 | −3 | −2 | −1 | 0 | 1 |
| −8 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| −7 | 0.00E+00 | 1.31E−36 | 0.00E+00 | 8.04E−37 | 0.00E+00 | 1.61E−36 | 0.00E+00 | 2.57E−35 | 4.18E−03 | 6.43E−36 |
| −6 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| −5 | 0.00E+00 | 2.55E−36 | 0.00E+00 | 1.57E−36 | 0.00E+00 | 3.14E−36 | 0.00E+00 | 5.02E−35 | 8.15E−03 | 1.26E−35 |
| −4 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| −3 | 0.00E+00 | 7.06E−36 | 0.00E+00 | 4.34E−36 | 0.00E+00 | 8.69E−36 | 0.00E+00 | 1.39E−34 | 2.26E−02 | 3.48E−35 |
| −2 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| −1 | 0.00E+00 | 6.34E−35 | 0.00E+00 | 3.90E−35 | 0.00E+00 | 7.81E−35 | 0.00E+00 | 1.25E−33 | 2.03E−01 | 3.12E−34 |
| 0 | 0.00E+00 | 4.18E−03 | 0.00E+00 | 8.15E−03 | 0.00E+00 | 2.26E−02 | 0.00E+00 | 2.03E−01 | 3.85E−33 | 2.03E−01 |
| 1 | 0.00E+00 | 6.34E−35 | 0.00E+00 | 3.90E−35 | 0.00E+00 | 7.81E−35 | 0.00E+00 | 1.25E−33 | 2.03E−01 | 3.12E−34 |
| 2 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| 3 | 0.00E+00 | 7.06E−36 | 0.00E+00 | 4.34E−36 | 0.00E+00 | 8.69E−36 | 0.00E+00 | 1.39E−34 | 2.26E−02 | 3.48E−35 |
| 4 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| 5 | 0.00E+00 | 2.55E−36 | 0.00E+00 | 1.57E−36 | 0.00E+00 | 3.14E−36 | 0.00E+00 | 5.02E−35 | 8.15E−03 | 1.26E−35 |
| 6 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| 7 | 0.00E+00 | 1.31E−36 | 0.00E+00 | 8.04E−37 | 0.00E+00 | 1.61E−36 | 0.00E+00 | 2.57E−35 | 4.18E−03 | 6.43E−36 |
| 8 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |

| Degree | 2 | 3 | 4 | 5 | 6 | 7 | 8 |
|---|---|---|---|---|---|---|---|
| −8 | 0.00E+00 | 0.00E+00 | 0.00E+00 | 0.00E+00 | 0.00E+00 | 0.00E+00 | 0.00E+00 |
| −7 | 0.00E+00 | 1.61E−36 | 0.00E+00 | 0.00E+00 | 0.00E+00 | 1.31E−36 | 0.00E+00 |
| −6 | 0.00E+00 | 0.00E+00 | 0.00E+00 | 0.00E+00 | 0.00E+00 | 0.00E+00 | 0.00E+00 |
| −5 | 0.00E+00 | 3.14E−36 | 0.00E+00 | 0.00E+00 | 0.00E+00 | 2.55E−36 | 0.00E+00 |
| −4 | 0.00E+00 | 0.00E+00 | 0.00E+00 | 0.00E+00 | 0.00E+00 | 0.00E+00 | 0.00E+00 |
| −3 | 0.00E+00 | 8.69E−36 | 0.00E+00 | 0.00E+00 | 0.00E+00 | 7.06E−36 | 0.00E+00 |
| −2 | 0.00E+00 | 0.00E+00 | 0.00E+00 | 0.00E+00 | 0.00E+00 | 0.00E+00 | 0.00E+00 |
| −1 | 0.00E+00 | 7.81E−35 | 0.00E+00 | 0.00E+00 | 0.00E+00 | 6.34E−35 | 0.00E+00 |
| 0 | 0.00E+00 | 2.26E−02 | 0.00E+00 | 8.15E−03 | 0.00E+00 | 4.18E−03 | 0.00E+00 |
| 1 | 0.00E+00 | 7.81E−35 | 0.00E+00 | 0.00E+00 | 0.00E+00 | 6.34E−35 | 0.00E+00 |
| 2 | 0.00E+00 | 0.00E+00 | 0.00E+00 | 0.00E+00 | 0.00E+00 | 0.00E+00 | 0.00E+00 |
| 3 | 0.00E+00 | 8.69E−36 | 0.00E+00 | 0.00E+00 | 0.00E+00 | 7.06E−36 | 0.00E+00 |
| 4 | 0.00E+00 | 0.00E+00 | 0.00E+00 | 0.00E+00 | 0.00E+00 | 0.00E+00 | 0.00E+00 |
| 5 | 0.00E+00 | 3.14E−36 | 0.00E+00 | 0.00E+00 | 0.00E+00 | 2.55E−36 | 0.00E+00 |
| 6 | 0.00E+00 | 0.00E+00 | 0.00E+00 | 0.00E+00 | 0.00E+00 | 0.00E+00 | 0.00E+00 |
| 7 | 0.00E+00 | 1.61E−36 | 0.00E+00 | 0.00E+00 | 0.00E+00 | 1.31E−36 | 0.00E+00 |
| 8 | 0.00E+00 | 0.00E+00 | 0.00E+00 | 0.00E+00 | 0.00E+00 | 0.00E+00 | 0.00E+00 |

Figure 3:
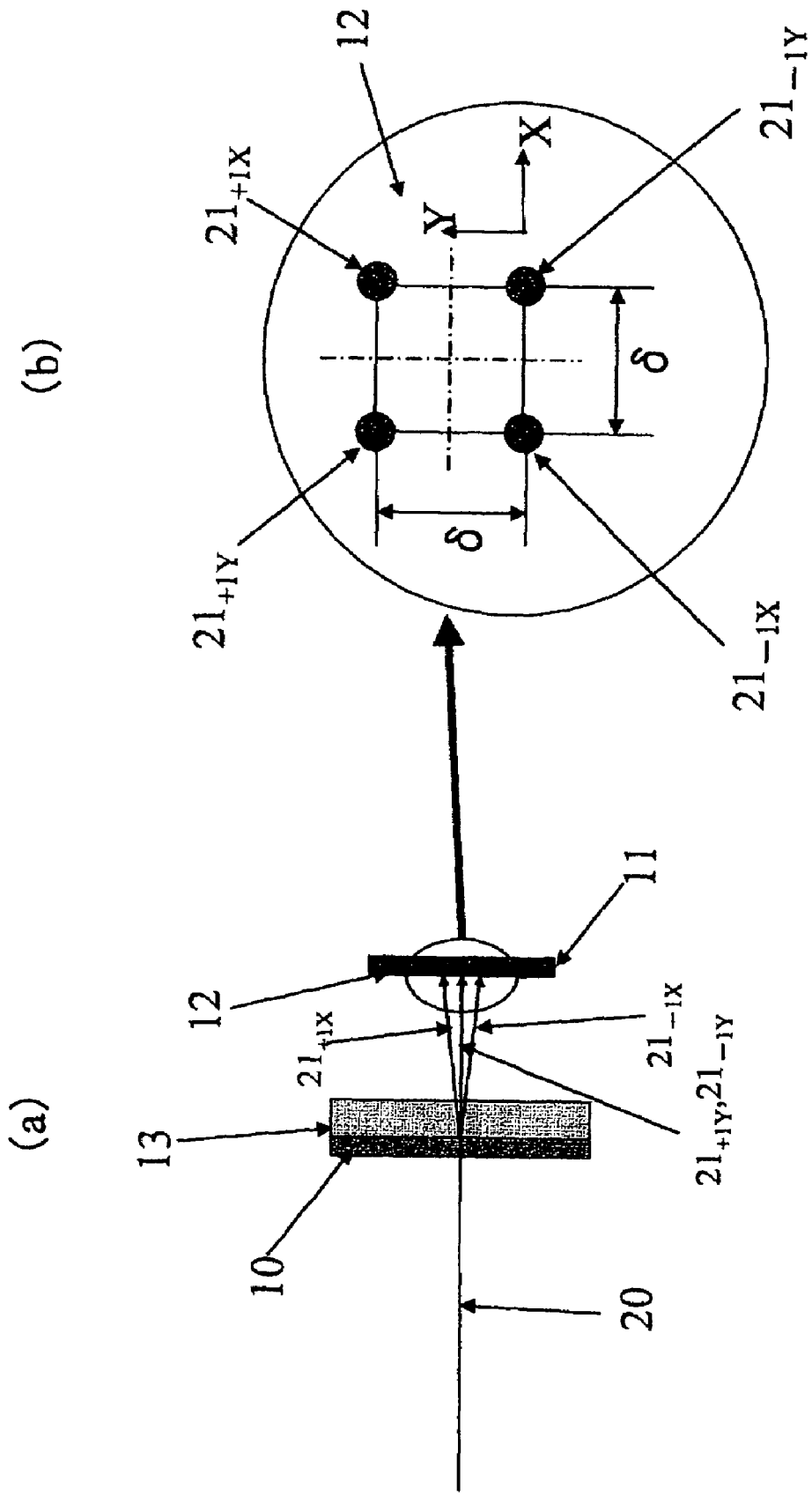
FIG. 3 is illustrative of why the diffractive optical element that underlies the invention can be used as an optical low-pass filter for an imaging optical system using a solid-state imaging device.
Figure 5:
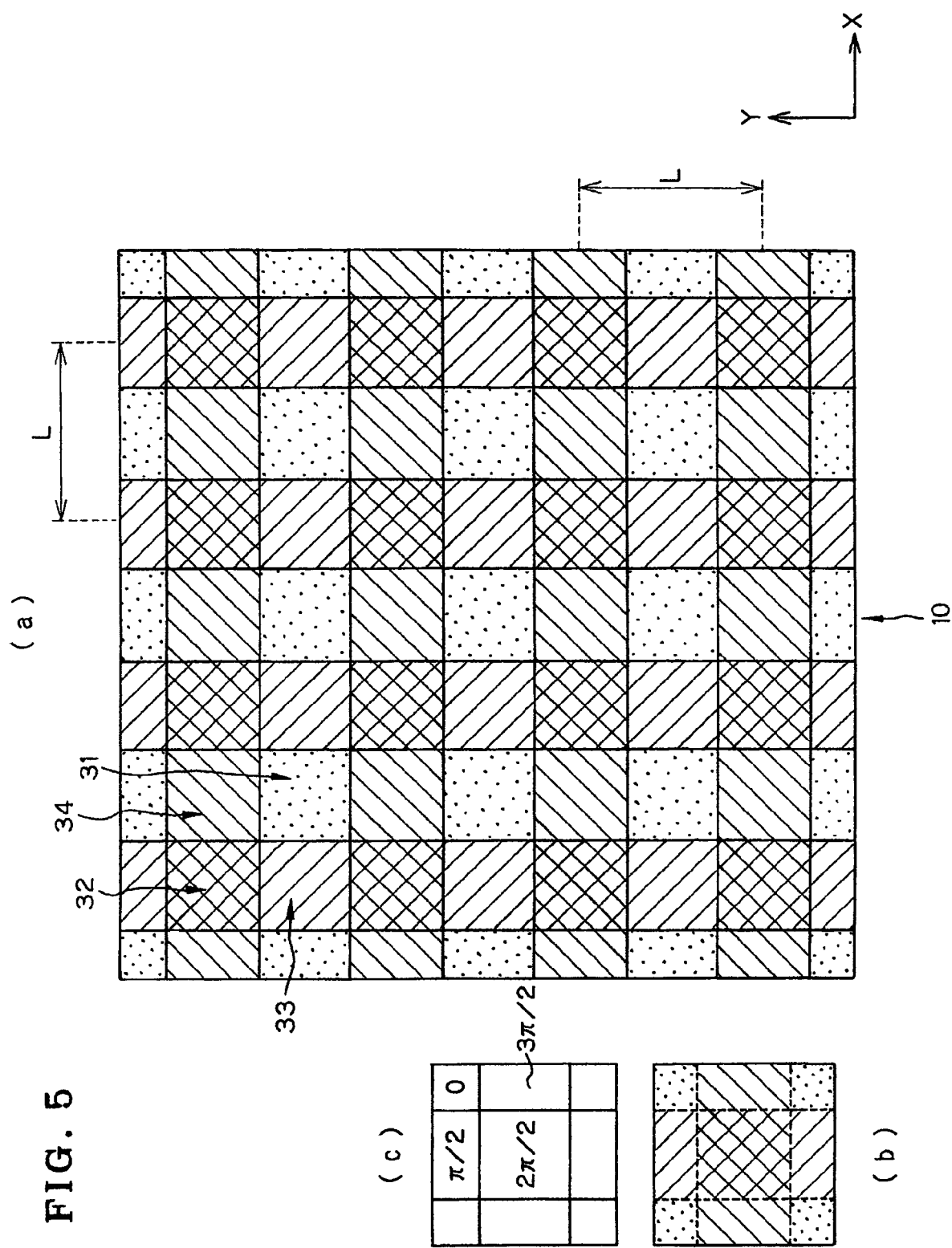
FIG. 5(a) is a plane view of the diffractive optical element with a four-valued phase modulation quantity according to the invention.
FIG. 5(b) is illustrative of its basic pattern.
FIG. 5(c) is illustrative of the phase distribution of that basic pattern.

From the results of Table 2, it is found that if the diffractive optical element 10 with a two-valued phase modulation quantity as shown in FIG. 1 is modified to the diffractive optical element 10 with a four-valued phase modulation quantity according to the invention as shown in FIG. 5, it is then possible to make the diffraction efficiency for split, effective four light beams $21_{+1X}$, $21_{-1X}$, $21_{+1Y}$, $21_{-1Y}$ much higher, and reduce unnecessary noise light as well. In other words, if the diffractive optical element 10 with such a four-valued phase modulation quantity is used as an optical low-pass filter for such an imaging optical system as depicted in FIG. 3, it is then possible to cut off high-frequency components more effectively, thereby eliminating unnecessary noises without causing any image quality deterioration. If the phases of square areas 32 to 34 are shifted slightly from $\pi$, $\pi/2$ (or $3\pi/2$), and $3\pi/2$ (or $\pi/2$), respectively, as is the case with the two-valued version, the intensity of zero-order diffracted light can then be much the same as that of the +first-order light $21_{+1X}$, $21_{+1Y}$, and the −first-order light $21_{-1X}$, $21_{-1Y}$; that diffractive optical element could also be used as a light beam splitter device adapted to split incident light 20 almost uniformly into five light beams.

Then consider the case where the diffractive optical element 10 with a four-valued phase modulation quantity as shown in FIG. 5 is modified to an eight-valued version, thereby achieving much higher diffraction efficiency. FIG. 6(a) shows a basic pattern for the eight-valued version of diffractive optical element 10. How to achieve the eight-valued version using this basic pattern is now explained. In the four-valued version of diffractive optical element 10, between square areas 31, 32, 33 and 34, there are four sides that differ mutually by $\pi/2$ or $3\pi/2$ in phase difference: specifically, a side of square area 33 tangent to the left or right of square area 31 (in the X-axis direction), a side of square area 34 tangent to the top or bottom of square area 31 (in the Y-axis direction), a side of square area 34 tangent to the left or right of square area 32 (in the X-axis direction), and a side of square area 33 tangent to the top or bottom of square area 32 (in the Y-axis direction). As shown in FIG. 6(b), areas 41, 42, 43 and 44, each having a phase between adjacent phase differences, are set about those sides such that when the sides are horizontal, triangles with a height of a/L are evenly intervened in the upper and lower areas, respectively, and when the sides are vertical, triangles with a height of a/L are evenly intervened in the left and right area, respectively. In other words, area 41 having a phase of $\pi/4$ lying halfway between areas 31 and 33 is set between areas 31 and 33; area 42 having a phase of $3\pi/4$ lying halfway between areas 33 and 32 is set between areas 33 and 32; and area 43 having a phase of $5\pi/4$ lying halfway between areas 32 and 34 is set between areas 32 and 34. Between areas 34 and 31, area 44 having a phase of $7\pi/4$ lying halfway between area 31 having a phase equal to $2\pi$ and the phase of area 34 is set for the same reason that the phase $3\pi/2$ is allocated to area 34 in FIG. 4. It is here noted that as such areas 41, 42, 43 and 44 are set between areas 31, 32, 33 and 34, the areas 31, 32, 33 and 34 are no longer in square form.

Figure 7:
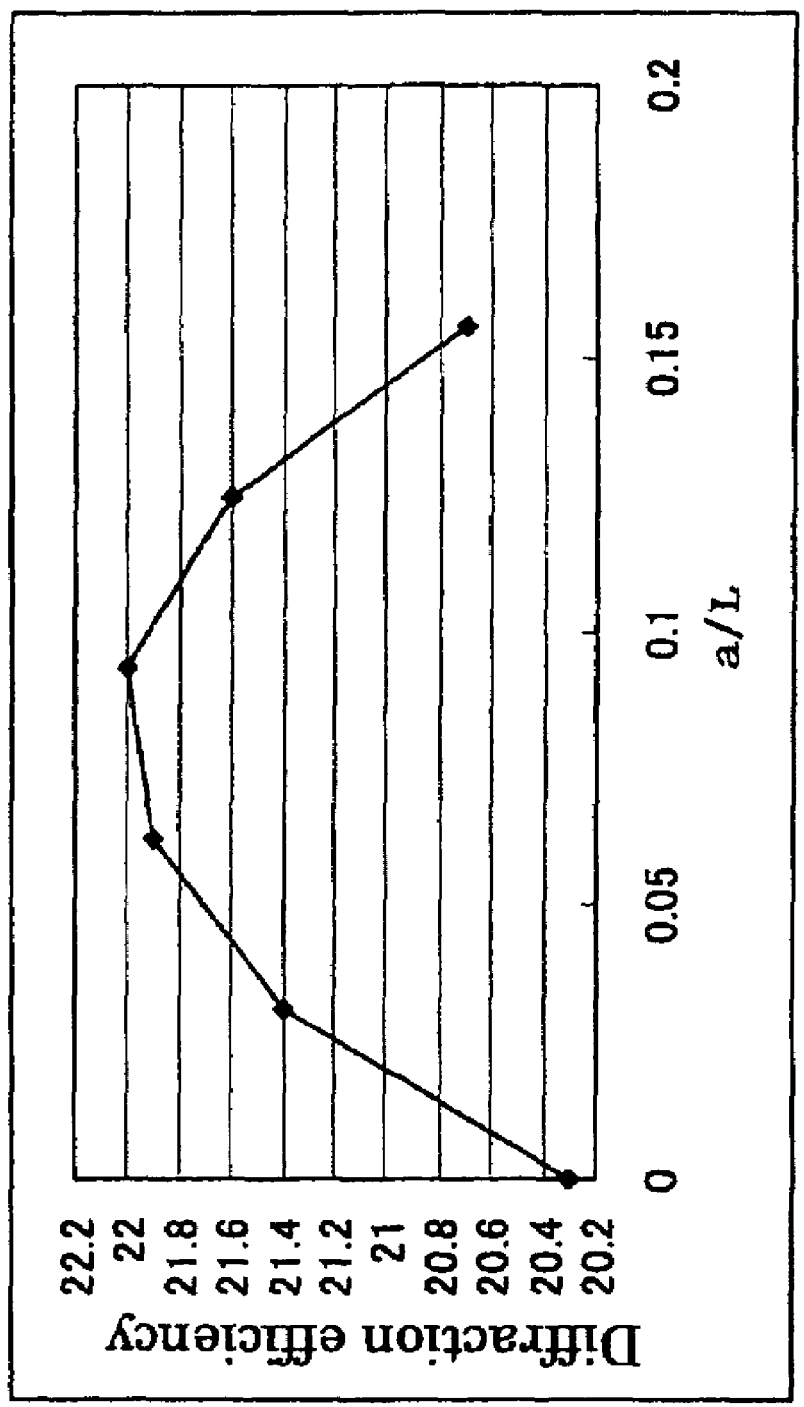
FIG. 7 is indicative of the diffraction efficiency of each diffracted light with the height of the intermediate area intervened in the square area of the diffractive optical element of FIG. 5 as a variable.

When such intermediate areas 41, 42, 43 and 44 are set to achieve the eight-valued version, such results as plotted in FIG. 7 are obtained for the diffraction efficiency for four diffracted light $21_{+1X}$, $21_{-1X}$, $21_{+1Y}$ and $21_{-1Y}$, with a/L (L is the repetitive pitch of the basic pattern in the X- and Y-axis directions) indicative of the intervened height with respect to square areas 31 to 34 and a as a variable. From those results, it is found that when $1/32 \leq a/L \leq 5/32$ ($0.03125 \leq a/L \leq 0.15625$) is satisfied with respect to a/L, there is higher diffraction efficiency obtained than could be possible with the diffractive optical element 10 of FIG. 5 with a four-valued phase modulation quantity. It is more preferable that $1/16 \leq a/L \leq 1/8$ ($0.0625 \leq a/L \leq 0.125$).

Figure 6:
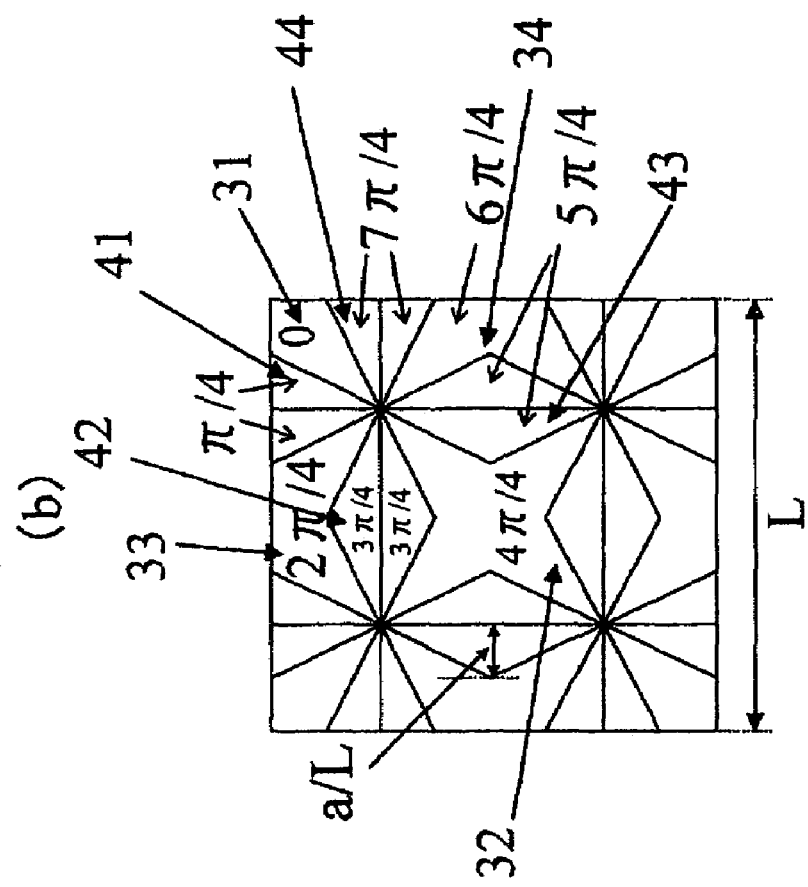
FIG. 6 is illustrative of the basic idea of eight-valuing the diffractive optical element of FIG. 5.
Figure 6:
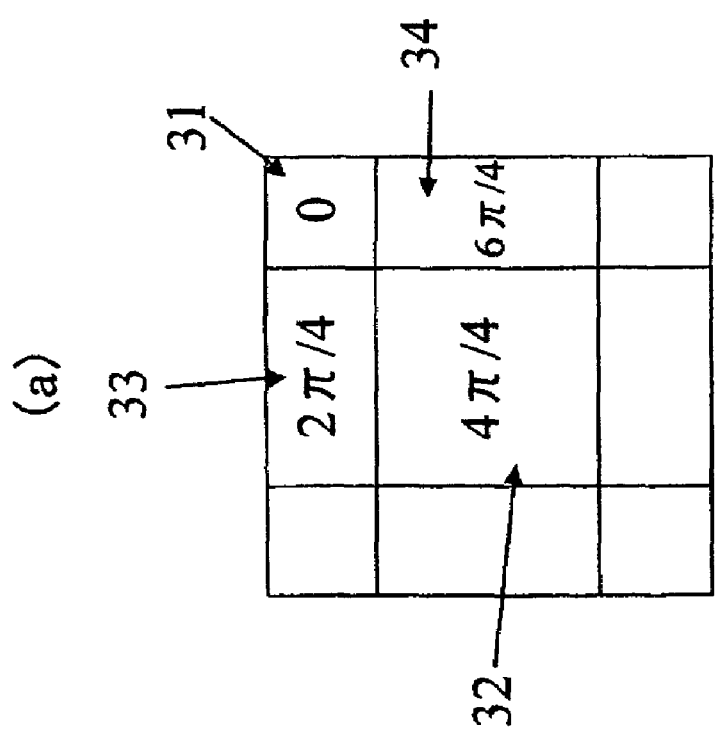
Figure 8:
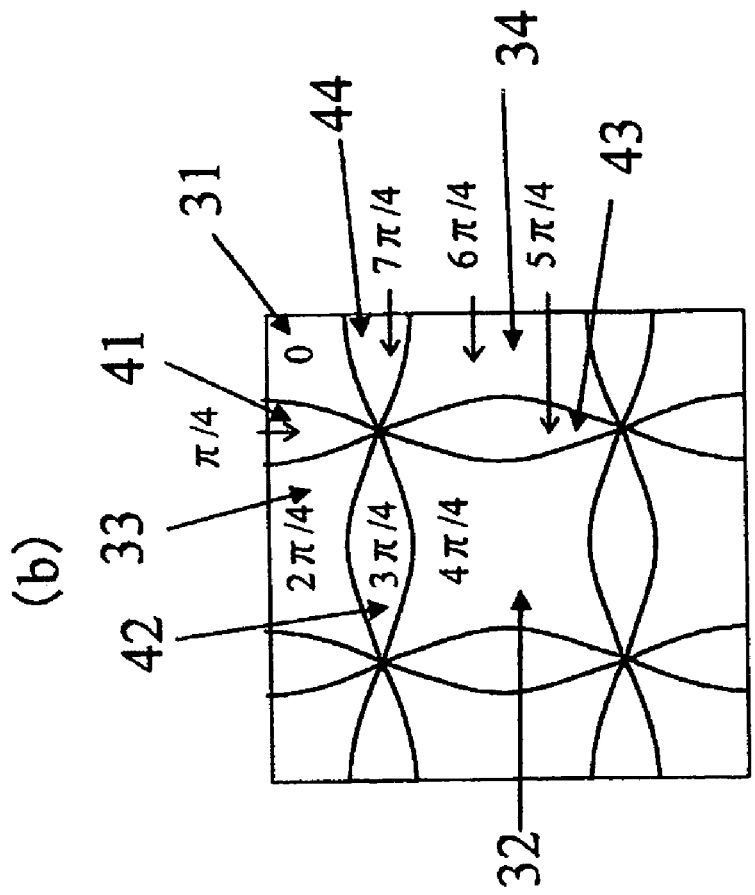
FIG. 8 is illustrative of how to approximate a boundary line by a sine wave at the time when the diffractive optical element of FIG. 5 is eight-valued.
Figure 8:
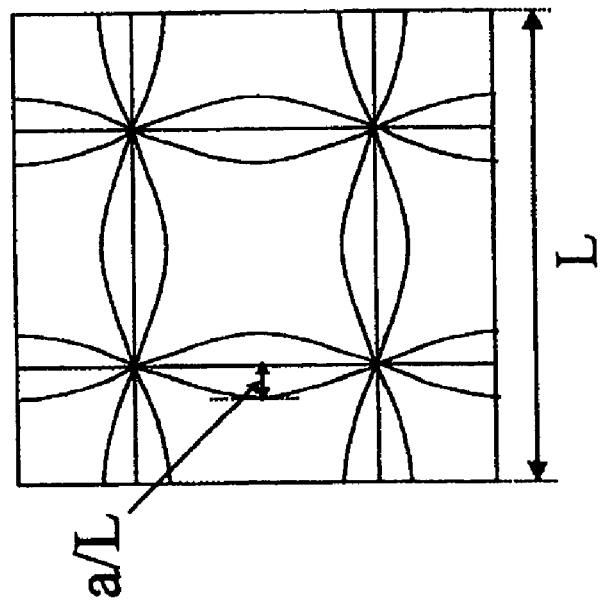

With the version of FIG. 6, however, higher-order diffraction is likely because the boundary curve between adjoining areas, for instance, areas 31 and 41 is not smooth. As shown in FIG. 8(*a*), therefore, that boundary curve is approximated by a smooth sine wave that passes through the vertexes (lattice points) of the original square areas 31 to 34 with an amplitude of a/L. FIG. 8(*b*) shows a basic pattern to this end. With a/L here set to a/L=9/128≈0.07, the diffraction efficiency for four diffracted light $21_{+1X}$, $21_{-1X}$, $21_{+1Y}$ and $21_{-1Y}$ is optimized at about 22.1%.

Figure 9:
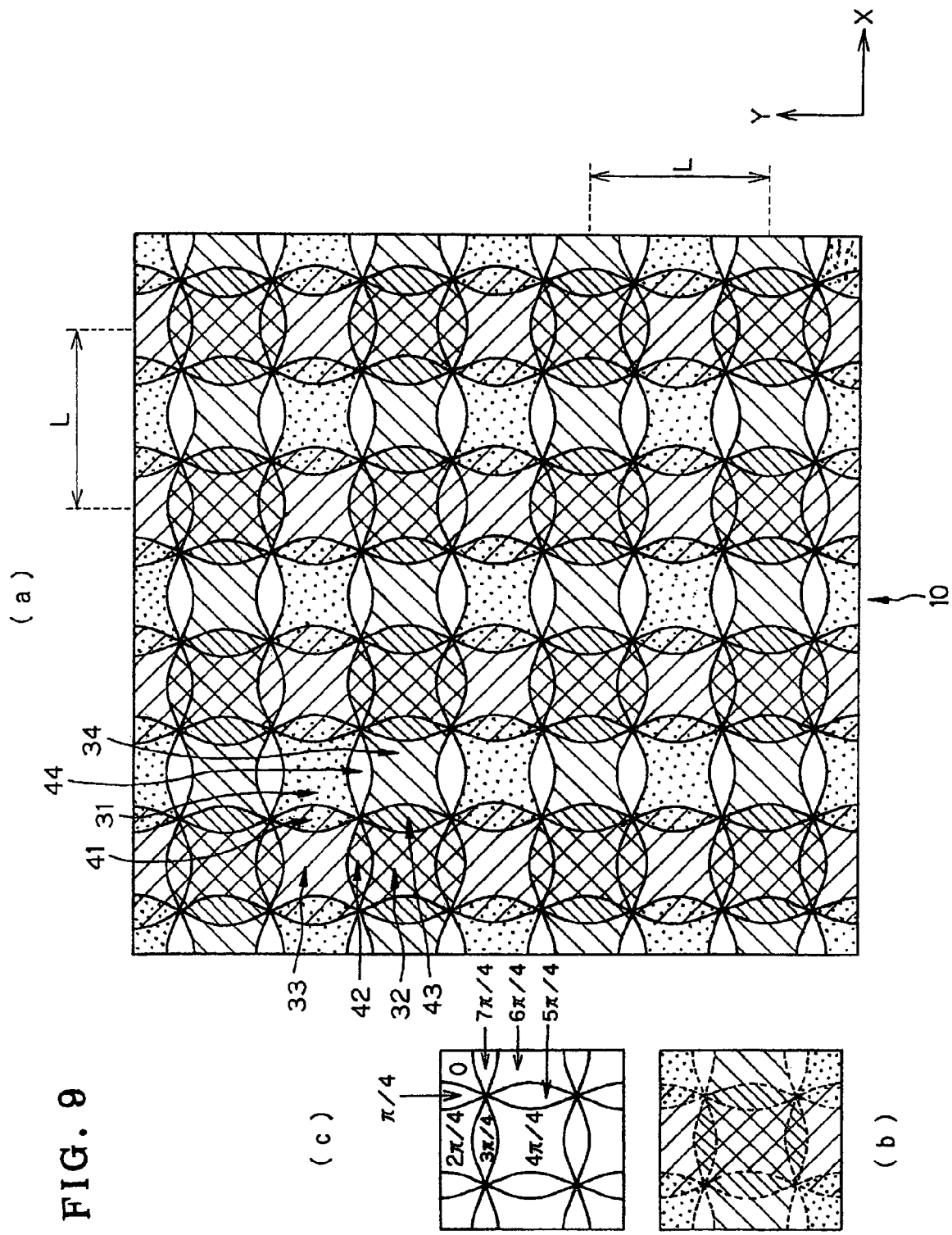
FIG. 9(a) is a plane view of the diffractive optical element with an eight-valued phase modulation quantity according to the invention.
FIG. 9(b) is illustrative of its basic pattern.
FIG. 9(c) is illustrative of the phase distribution of that basic pattern.
Figure 10:
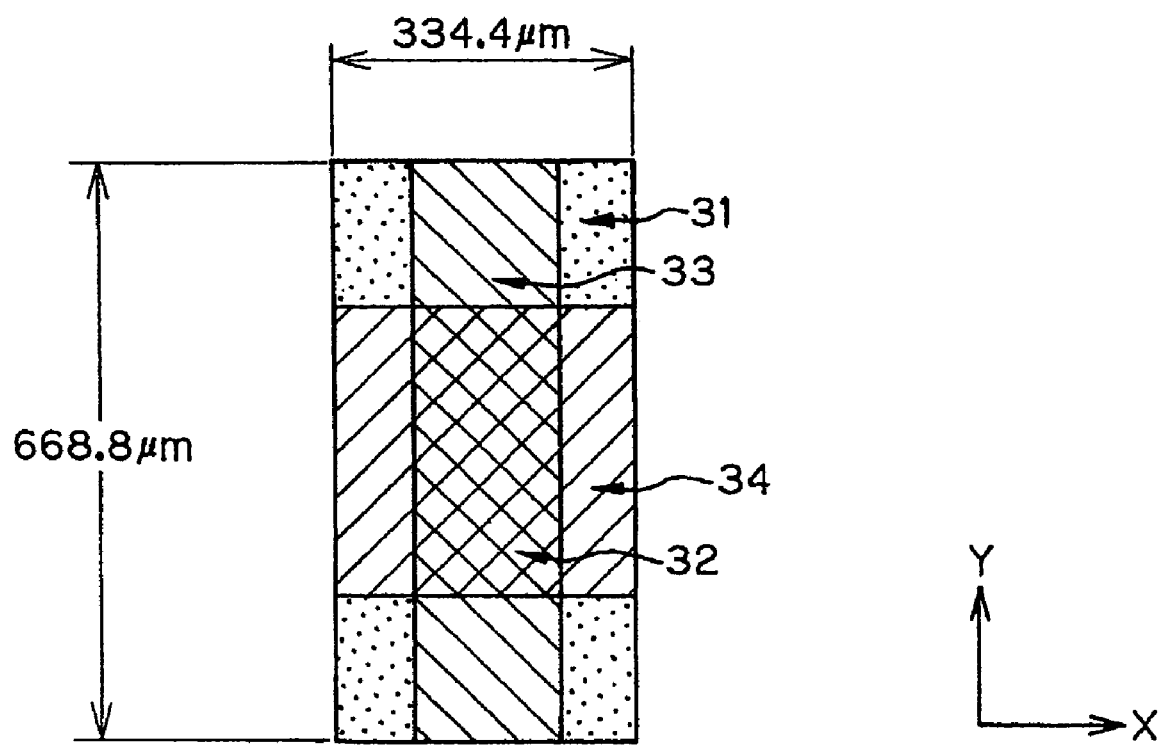
FIG. 10 is illustrative of how to form on a substrate a relief pattern preferable for copying the diffractive optical element of the invention.

FIG. 9(*a*) is a plane view of the diffractive optical element 10 with such an eight-valued phase modulation quantity that there is a mutual phase difference of π/4 between two-dimensionally adjoining areas 31, 41, 33, 42, 32, 43, 34, and 44; FIG. 9(*b*) is illustrative of its basic pattern; and FIG. 9(*c*) is illustrative of the phase distribution of that basic pattern. The diffractive optical element 10 of FIG. 9(*a*) is made up of locating 4×4 such basic patterns laterally and longitudinally. However, the boundary curve is approximated to a sine wave with a=9/128≈0.07. Table 3, just given below, shows the intensity of each diffraction order of the diffractive optical element 10 having an eight-valued phase modulation quantity, with the X-axis direction as abscissa, the Y-axis direction as ordinate, and each figure indicative of an order. Assume here that the standard wavelength is $\lambda_0$=532 nm, the wavelength used is likewise λ=532 nm, and the repetitive pitch of square areas 31 to 34 and 41 to 44 in the X- and Y-axis directions of the diffractive optical element 10 is L=334.4 μm. Four diffracted light $21_{+1X}$, $21_{-1X}$, $21_{+1Y}$ and $21_{-1Y}$ of FIG. 1 are corresponding to the (+1, 0) order, (−1, 0) order, (0, +1) order and (0, −1) order, respectively. If the intensity of incident light 20 is 100%, then there is 22.1%. From Table 3, the diffraction efficiency for the +first-order light $21_{+1X}$, $21_{+1Y}$, and the −first-order light $21_{-1X}$, $21_{-1Y}$ is found to be 88.4%, and the diffraction efficient for diffracted (noise) light of other orders is found to be 11.6%, with an SN ratio of 7.62.

TABLE 3

| Degree | −8 | −7 | −6 | −5 | −4 | −3 | −2 | −1 | 0 | 1 |
|---|---|---|---|---|---|---|---|---|---|---|
| −8 | 9.15E−39 | 2.10E−07 | 6.87E−37 | 1.16E−06 | 2.25E−36 | 8.00E−05 | 1.55E−37 | 1.13E−05 | 2.23E−35 | 1.13E−05 |
| −7 | 2.10E−07 | 3.05E−36 | 1.06E−06 | 1.07E−35 | 6.67E−05 | 2.14E−36 | 9.82E−04 | 4.69E−35 | 2.81E−04 | 4.12E−37 |
| −6 | 2.42E−36 | 1.06E−06 | 3.44E−37 | 1.32E−06 | 2.20E−37 | 6.78E−05 | 4.92E−37 | 2.19E−04 | 4.22E−34 | 2.19E−04 |
| −5 | 1.16E−08 | 4.55E−36 | 1.32E−06 | 1.33E−35 | 8.51E−06 | 1.99E−36 | 1.28E−03 | 5.30E−35 | 1.60E−04 | 1.67E−35 |
| −4 | 4.43E−36 | 6.67E−05 | 2.87E−37 | 8.51E−06 | 8.37E−36 | 1.52E−05 | 2.65E−36 | 6.98E−04 | 9.05E−35 | 6.98E−04 |
| −3 | 8.00E−05 | 7.11E−36 | 6.78E−05 | 1.51E−35 | 1.52E−05 | 1.61E−35 | 8.30E−04 | 4.57E−35 | 8.61E−03 | 4.60E−35 |
| −2 | 1.06E−36 | 9.82E−04 | 3.40E−38 | 1.28E−03 | 2.81E−35 | 8.30E−04 | 2.20E−36 | 2.23E−03 | 2.57E−35 | 2.23E−03 |
| −1 | 1.13E−05 | 7.17E−35 | 2.19E−04 | 1.02E−35 | 6.98E−04 | 5.93E−35 | 2.23E−03 | 5.93E−34 | 2.21E−01 | 7.06E−34 |
| 0 | 6.99E−36 | 2.81E−04 | 9.71E−36 | 1.60E−04 | 2.43E−34 | 8.61E−03 | 8.30E−36 | 2.21E−01 | 1.95E−33 | 2.21E−01 |
| 1 | 1.13E−05 | 7.18E−35 | 2.19E−04 | 1.23E−35 | 6.98E−04 | 5.99E−35 | 2.23E−03 | 6.32E−34 | 2.21E−01 | 6.06E−34 |
| 2 | 1.03E−36 | 9.82E−04 | 6.86E−39 | 1.28E−03 | 3.06E−35 | 8.30E−04 | 2.04E−36 | 2.23E−03 | 3.72E−35 | 2.23E−03 |
| 3 | 7.99E−05 | 7.28E−36 | 6.81E−05 | 1.51E−35 | 1.51E−05 | 1.47E−35 | 8.30E−04 | 4.26E−35 | 8.61E−03 | 5.47E−35 |
| 4 | 3.85E−36 | 6.67E−05 | 7.14E−37 | 8.51E−06 | 8.29E−36 | 1.51E−05 | 2.97E−36 | 6.98E−04 | 9.23E−35 | 6.98E−04 |
| 5 | 1.15E−06 | 4.45E−36 | 1.27E−06 | 1.32E−35 | 8.51E−06 | 1.73E−36 | 1.28E−03 | 2.18E−35 | 1.60E−04 | 1.12E−35 |
| 6 | 2.79E−36 | 1.08E−06 | 6.13E−37 | 1.27E−06 | 1.35E−37 | 6.81E−05 | 4.24E−37 | 2.19E−04 | 3.89E−34 | 2.19E−04 |
| 7 | 2.36E−07 | 3.27E−36 | 1.08E−06 | 1.19E−35 | 6.67E−05 | 1.81E−36 | 9.82E−04 | 4.66E−35 | 2.81E−04 | 6.11E−36 |
| 8 | 6.23E−38 | 2.36E−07 | 7.21E−37 | 1.15E−06 | 1.11E−36 | 7.99E−05 | 1.18E−37 | 1.13E−05 | 5.09E−35 | 1.13E−05 |

| Degree | 2 | 3 | 4 | 5 | 6 | 7 | 8 |
|---|---|---|---|---|---|---|---|
| −8 | 4.03E−37 | 7.99E−05 | 1.85E−36 | 1.15E−06 | 4.13E−37 | 2.36E−07 | 2.69E−38 |
| −7 | 9.82E−04 | 1.02E−35 | 6.67E−05 | 7.35E−36 | 1.08E−06 | 5.86E−36 | 2.36E−07 |
| −6 | 1.00E−36 | 6.81E−05 | 1.39E−36 | 1.27E−06 | 7.32E−37 | 1.08E−06 | 2.40E−36 |
| −5 | 1.28E−03 | 1.35E−35 | 8.61E−06 | 6.38E−36 | 1.27E−06 | 3.51E−36 | 1.15E−06 |
| −4 | 3.95E−36 | 1.51E−05 | 1.03E−35 | 8.51E−06 | 5.34E−37 | 6.67E−05 | 4.99E−36 |
| −3 | 8.30E−04 | 2.96E−35 | 1.51E−05 | 1.91E−36 | 6.81E−05 | 4.18E−36 | 7.99E−05 |
| −2 | 1.23E−35 | 8.30E−04 | 2.64E−35 | 1.28E−03 | 5.08E−37 | 9.82E−04 | 3.36E−37 |
| −1 | 2.23E−03 | 5.60E−35 | 6.98E−04 | 4.82E−36 | 2.19E−04 | 8.01E−35 | 1.13E−05 |
| 0 | 3.41E−35 | 8.61E−03 | 2.40E−34 | 1.60E−04 | 8.67E−36 | 2.81E−04 | 7.61E−36 |
| 1 | 2.23E−03 | 4.52E−35 | 6.98E−04 | 5.20E−36 | 2.19E−04 | 5.97E−35 | 1.13E−05 |
| 2 | 1.29E−35 | 8.30E−04 | 2.23E−35 | 1.28E−03 | 9.44E−37 | 9.82E−04 | 3.90E−37 |
| 3 | 8.30E−04 | 2.71E−35 | 1.52E−05 | 1.92E−36 | 6.78E−05 | 3.77E−36 | 8.00E−05 |
| 4 | 3.82E−36 | 1.52E−05 | 8.35E−36 | 8.51E−06 | 3.68E−37 | 6.67E−05 | 4.53E−36 |
| 5 | 1.28E−03 | 1.18E−35 | 8.51E−06 | 5.55E−36 | 1.32E−06 | 2.70E−36 | 1.16E−06 |
| 6 | 5.43E−37 | 6.78E−05 | 4.02E−37 | 1.32E−06 | 4.19E−37 | 1.06E−06 | 2.86E−36 |
| 7 | 9.82E−04 | 9.68E−36 | 6.67E−05 | 7.70E−36 | 1.06E−06 | 8.72E−36 | 2.10E−07 |
| 8 | 3.92E−37 | 8.00E−05 | 2.25E−36 | 1.16E−06 | 3.57E−37 | 2.10E−07 | 1.11E−37 |

From the results of Table 3, it is found that if such a diffractive optical element 10 as shown in FIG. 1 is modified to the diffractive optical element 10 with an eight-valued phase modulation quantity according to the invention as shown in FIG. 9, it is then possible to make the diffraction efficiency for split, effective four light beams $21_{+1X}$, $21_{-1X}$, $21_{+1Y}$, $21_{-1Y}$ much higher, and reduce unnecessary noise light as well. In other words, if the diffractive optical element 10 with such an eight-valued phase modulation quantity is used as an optical low-pass filter for such an imaging optical system as depicted in FIG. 3, it is then possible to cut off high-frequency components more effectively, thereby eliminating unnecessary noises without causing any image quality deterioration. If the phases of square areas 32 to 34 and 41 to 44 are shifted slightly from $4\pi/4$, $2\pi/4$, $6\pi/4$, $\pi/4$, $3\pi/4$, $5\pi/4$ and $7\pi/4$, respectively, as is the case with the two- or four-valued version, the intensity of zero-order diffracted light can then be much the same as that of the +first-order light $21_{+1X}$, $21_{+1Y}$, and the –first-order light $21_{-1X}$, $21_{-1Y}$; that diffractive optical element could also be used as a light beam splitter device adapted to split incident light 20 almost uniformly into five light beams.

While the diffractive optical element 10 of FIG. 5 or FIG. 9 has been described as having an equal repetitive pitch in the X- and Y-axis directions, it is understood that even with different pitches in the X- and Y-axis directions, it is possible to split incident light 20 almost uniformly into four diffracted light $21_{+1X}$, $21_{-1X}$, $21_{+1Y}$ and $21_{-1Y}$ or five diffracted light beams including an additional zero-order diffracted light. This is now explained with reference to the arrangement of FIG. 5. Table 4, just given below, shows the intensity of each diffraction order at the time when the length (repetitive pitch) in the X-axis direction of the basic pattern for the diffractive optical element 10 with a four-valued phase modulation quantity is set to 334.4 μm, and the length (repetitive pitch) of the basic pattern in the Y-axis direction is set to 668.8 μm twice as long. In Table 4 with the X-axis direction as abscissa, the Y-axis direction as ordinate, and each numeral indicative of an order, assume that the standard wavelength is $\lambda_0=532$ nm, and the wavelength used is likewise $\lambda=532$ nm. Four diffracted light $21_{+1X}$, $21_{-1X}$, $21_{+1Y}$ and $21_{-1Y}$ of FIG. 1 are corresponding to the (+1, 0) order, (–1, 0) order, (0, +1) order and (0, –1) order, respectively. From Table 4, it is found that both the diffraction efficiency and the SN ratio are much the same as in Table 2.

TABLE 4

| Degree | Diffraction efficiency | | | | | | | | | |
|---|---|---|---|---|---|---|---|---|---|---|
| | −8 | −7 | −6 | −5 | −4 | −3 | −2 | −1 | 0 | 1 |
| −8 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| −7 | 0.00E+00 | 2.50E−36 | 0.00E+00 | 3.19E−36 | 0.00E+00 | 7.98E−36 | 0.00E+00 | 0.00E+00 | 4.15E−03 | 0.00E+00 |
| −6 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| −5 | 0.00E+00 | 4.88E−36 | 0.00E+00 | 6.25E−36 | 0.00E+00 | 1.56E−35 | 0.00E+00 | 0.00E+00 | 8.12E−03 | 0.00E+00 |
| −4 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| −3 | 0.00E+00 | 1.36E−35 | 0.00E+00 | 1.74E−35 | 0.00E+00 | 4.34E−35 | 0.00E+00 | 0.00E+00 | 2.25E−02 | 0.00E+00 |
| −2 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| −1 | 0.00E+00 | 1.22E−34 | 0.00E+00 | 1.56E−34 | 0.00E+00 | 3.90E−34 | 0.00E+00 | 0.00E+00 | 2.03E−01 | 0.00E+00 |
| 0 | 0.00E+00 | 4.18E−03 | 0.00E+00 | 8.15E−03 | 0.00E+00 | 2.26E−02 | 0.00E+00 | 2.03E−01 | 3.85E−33 | 2.03E−01 |
| 1 | 0.00E+00 | 1.22E−34 | 0.00E+00 | 1.56E−34 | 0.00E+00 | 3.90E−34 | 0.00E+00 | 0.00E+00 | 2.03E−01 | 0.00E+00 |
| 2 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| 3 | 0.00E+00 | 1.36E−35 | 0.00E+00 | 1.74E−35 | 0.00E+00 | 4.34E−36 | 0.00E+00 | 0.00E+00 | 2.25E−02 | 0.00E+00 |
| 4 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| 5 | 0.00E+00 | 4.88E−36 | 0.00E+00 | 6.25E−36 | 0.00E+00 | 1.56E−35 | 0.00E+00 | 0.00E+00 | 8.12E−03 | 0.00E+00 |
| 6 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| 7 | 0.00E+00 | 2.50E−36 | 0.00E+00 | 3.19E−36 | 0.00E+00 | 7.98E−36 | 0.00E+00 | 0.00E+00 | 4.15E−03 | 0.00E+00 |
| 8 | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |

| Degree | 2 | 3 | 4 | 5 | 6 | 7 | 8 |
|---|---|---|---|---|---|---|---|
| −8 | 0.00E+00 | 0.00E+00 | 0.00E+00 | 0.00E+00 | 0.00E+00 | 0.00E+00 | 0.00E+00 |
| −7 | 0.00E+00 | 1.60E−36 | 0.00E+00 | 1.70E−36 | 0.00E+00 | 0.00E+00 | 0.00E+00 |
| −6 | 0.00E+00 | 0.00E+00 | 0.00E+00 | 0.00E+00 | 0.00E+00 | 0.00E+00 | 0.00E+00 |
| −5 | 0.00E+00 | 3.13E−36 | 0.00E+00 | 3.32E−36 | 0.00E+00 | 0.00E+00 | 0.00E+00 |
| −4 | 0.00E+00 | 0.00E+00 | 0.00E+00 | 0.00E+00 | 0.00E+00 | 0.00E+00 | 0.00E+00 |
| −3 | 0.00E+00 | 8.68E−36 | 0.00E+00 | 9.22E−36 | 0.00E+00 | 0.00E+00 | 0.00E+00 |
| −2 | 0.00E+00 | 0.00E+00 | 0.00E+00 | 0.00E+00 | 0.00E+00 | 0.00E+00 | 0.00E+00 |
| −1 | 0.00E+00 | 7.81E−35 | 0.00E+00 | 8.29E−35 | 0.00E+00 | 0.00E+00 | 0.00E+00 |
| 0 | 0.00E+00 | 2.26E−02 | 0.00E+00 | 8.15E−03 | 0.00E+00 | 4.18E−03 | 0.00E+00 |
| 1 | 0.00E+00 | 7.81E−35 | 0.00E+00 | 8.29E−35 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 |
| 3 | 0.00E+00 | 8.68E−36 | 0.00E+00 | 9.22E−36 | 0.00E+00 | 0.00E+00 | 0.00E+00 |
| 4 | 0.00E+00 | 0.00E+00 | 0.00E+00 | 0.00E+00 | 0.00E+00 | 0.00E+00 | 0.00E+00 |
| 5 | 0.00E+00 | 3.13E−36 | 0.00E+00 | 3.32E−36 | 0.00E+00 | 0.00E+00 | 0.00E+00 |
| 6 | 0.00E+00 | 0.00E+00 | 0.00E+00 | 0.00E+00 | 0.00E+00 | 0.00E+00 | 0.00E+00 |
| 7 | 0.00E+00 | 1.60E−36 | 0.00E+00 | 1.70E−36 | 0.00E+00 | 0.00E+00 | 0.00E+00 |
| 8 | 0.00E+00 | 0.00E+00 | 0.00E+00 | 0.00E+00 | 0.00E+00 | 0.00E+00 | 0.00E+00 |

Assume here that the transparent substrate 1 formed on the surface of the diffractive optical element 10 has a refractive index n. It is then needed to make the area 32 giving rise to the phase $\pi$ thicker by $d_{4/4}$ than the area 31 giving rise to the phase 0, and satisfy a relation $2(n-1)d_{4/4}/\lambda_0=(2s+1)$ where s is an integer; s is not necessarily zero. Likewise, it is needed to make the area 33 giving rise to the phase $\pi/2$ thicker by $d_{2/4}$, and satisfy a relation $2(n-1)d_{2/4}/\lambda_0=(2q+\frac{1}{2})$ where $\underline{q}$ is an integer; it is needed to make the area 34 giving rise to the phase $3\pi/2$ thicker by $d_{6/4}$, and satisfy a relation $2(n-1)d_{6/4}/\lambda_0=(2r+\frac{3}{2})$ where $\underline{r}$ is an integer; it is needed to make the area 41 giving rise to the phase $\pi/4$ thicker by $d_{1/4}$, and satisfy a relation $2(n-1)d_{1/4}/\lambda_0=(2e+\frac{1}{4})$ where $\underline{e}$ is an integer; it is needed to make the area 42 giving rise to the phase $3\pi/4$ thicker by $d_{3/4}$, and satisfy a relation $2(n-1)d_{3/4}/\lambda_0=(2f+\frac{3}{4})$ where $\underline{f}$ is an integer; it is needed to make the area 43 giving rise to the phase $5\pi/4$ thicker by $d_{5/4}$, and satisfy a relation $2(n-1)d_{5/4}/\lambda_0=(2g+\frac{5}{4})$ where $\underline{g}$ is an integer; and it is needed to make the area 44 giving rise to the phase $7\pi/4$ thicker by $d_{7/4}$, and satisfy a relation $2(n-1)d_{7/4}/\lambda_0=(2h+\frac{7}{4})$ where $\underline{h}$ is an integer. Again, $\underline{q}$, $\underline{r}$, $\underline{s}$, $\underline{e}$, $\underline{f}$, $\underline{g}$ and $\underline{h}$ are not necessarily zero. The area 31 giving rise to the phase 0 could be made up in such a way as to give rise to a phase $2p\pi$ where p is an integer.

If the phases of the aforesaid areas 32-34 and 41-44 are shifted by at most 25% from $4\pi/4$, $2\pi/4$, $6\pi/4$, $\pi/4$, $3\pi/4$, $5\pi/4$ and $7\pi/4$, respectively, it is then possible to split incident light 20 almost uniformly into four or five light beams; the aforesaid diffractive element 10 could be used as a light beam splitter device.

Such inventive diffractive optical elements as described above, and optical low-pass filters that use them, for instance, may be fabricated by means of photolithography processes used for the fabrication of computer-generated holograms, or copying processes that utilize relief pattern dies (Patent Publication 10). Examples of how to fabricate the inventive diffractive optical element with a four- or eight-valued phase modulation quantity are now given.

Figure 11:
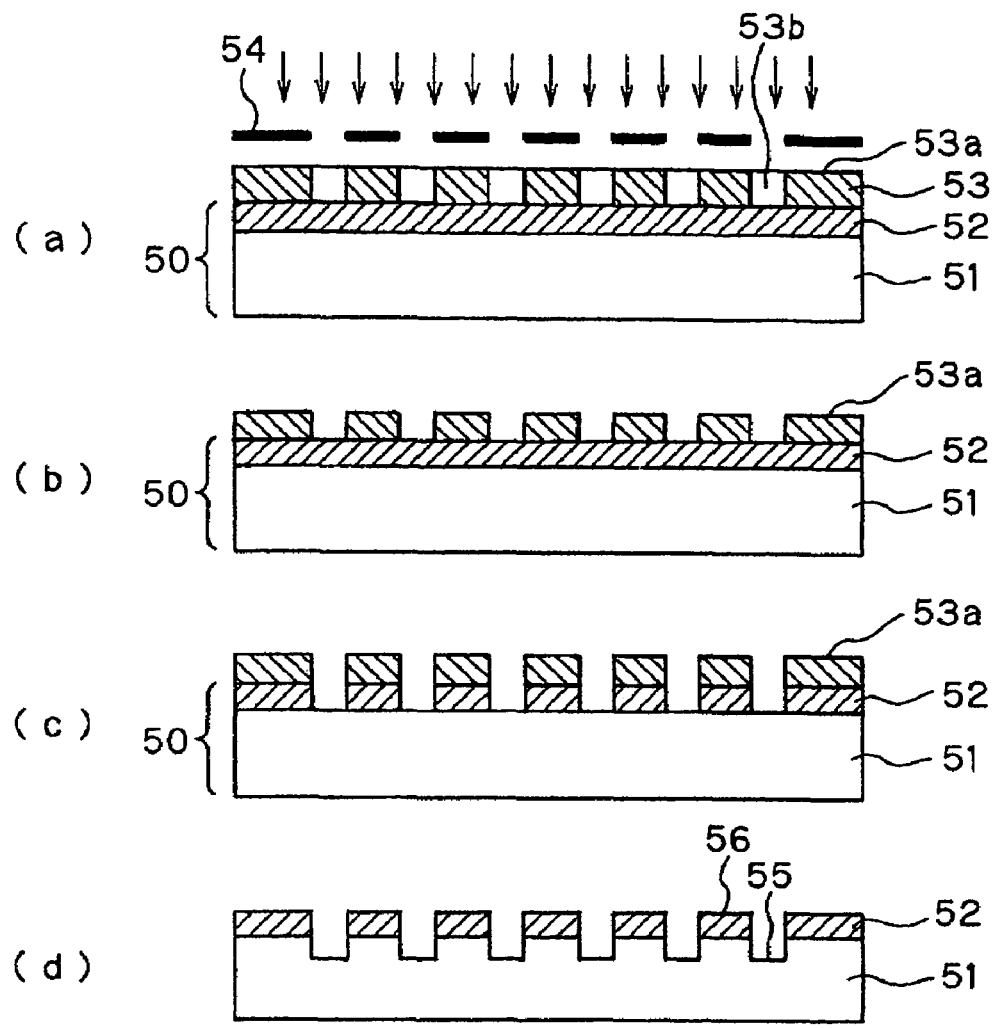
FIG. 11 is illustrative of one example of how to form on a substrate a relief pattern die preferable to copy the diffractive optical element of the invention.

FIGS. 11(*a*) to 11(*d*) are illustrative of one example of how to form on a substrate a relief pattern die preferable for copying the inventive diffractive optical element 10. In this example, a step of making a photomask for semiconductor circuit fabrication as well as a photomask blank and a lithography system such a laser or electron beam lithography system could be used. The diffractive optical element 10 here comprises a two-dimensional arrangement wherein there is the same basic pattern (FIG. 5(*b*), FIG. 9(*b*)) appearing repetitively, and it is only needed to provide such a lithography system with data about that basic pattern and the aspect or other pitch necessary for that arrangement, so that loads on the data processing of the lithography system can be much more reduced. Loads on the computation for obtaining the basic pattern data, too, can be much more reduced as compared with when the whole of the diffractive optical element 10 is computed. This is because when the size of the diffractive optical element 10 is 5 cm×5 cm and the size of the basic pattern (L×L) is 250 µm×250 µm, the data about the basic pattern are much more reduced than the data about the whole diffractive optical element 10: 1/40,000 in terms of area ratio.

As depicted in FIG. 11(*a*), there is a photomask blank sheet 50 provided, in which a surface-low-reflection chromium thin film 52 is laminated on a substrate 51 that is typically formed of a synthetic quartz substrate of 15 cm×15 cm in size and 6.4 mm in thickness. On that chromium thin film 52, there is a resist (of the positive type here) layer 53 resistant to dry etching provided in a thin-film form of, for instance, about 400 nm in thickness. As an example, ZEP7000 made by Nippon Zeon Co., Ltd. may be used as the dry etching resist, and resist lamination may be carried out by spin coating with a spinner or the like. This resist layer 53 is then subjected to pattern exposure. The pattern exposure may be implemented by use of not only a pattern 54 but also a laser or electron beam lithography system capable of laser or electron beam scan. For instance, "MEBES4500" that is an electron beam lithography system made by ETEC Co., Ltd. may be used.

Soluble regions 53*b* with a cured resist resin and unexposed regions 53*a* are sectioned off by exposure, and as depicted in FIG. 11(*b*), spray development with spraying of a developer or the like is applied for solvent development, thereby dissolving the soluble regions 53*b* away to form a resist pattern 53*a*. It is here noted that a negative type resist may be used as the resist, and development may be implemented even by dipping in a developer. For the subsequent steps, just only dry etching but also wet dipping etching may be carried out; the resist used is not limited to a resist resistant to drying etching.

Utilizing the formed resist pattern 53*a*, portions of the chromium thin film 52 that are not covered with the resist are dry etched away, as depicted in FIG. 11(*c*), to leave the underlying quartz substrate 51 exposed under the openings. Then, dry etching is again applied to the exposed quartz substrate 51, as depicted in FIG. 11(*d*). As etching goes further, there are openings 55 formed with the formation of edges comprising the intact portion of the quartz substrate 51 coated with the chromium thin film 52 and resist thin film 53*a* in this order from below. Thereafter, the resist thin film is dissolved away or otherwise removed to obtain the quartz substrate having openings 55 occurring from etching of the quartz substrate 51 and edges 56, each having the chromium thin film 52 laminated to its vertex.

Only by use of the aforesaid process, the resultant quartz substrate has only two values, i.e., openings and edges (two levels, upper and lower; regarding depth, there is another level surface occurring in addition to the intact surface of the quartz substrate). However, if a photoetching process comprising resist formation→pattern exposure→resist development→dry etching of chromium thin film→dry etching of quartz substrate→resist removal is repetitively applied to the substrate obtained as mentioned above, it is then possible to apply photo-etching to the openings and edges occurring from the first photoetching. Here, if etching depth is controlled, then there are three additional level surfaces occurring in addition to the intact surface of the quartz substrate; there are a total of four levels (four values) inclusive of the intact surface of the quartz substrate). For the resist here, an i-line resist of the novolac resin type having drying etching resistance is used in a thin film form of about 465 nm, and for exposure, for instance, ALTA3500 is used as a lithography system.

Figure 12:
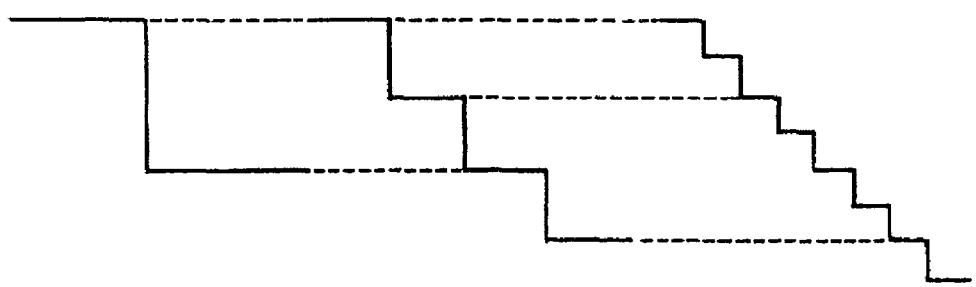
FIG. 12 is illustrative of the number of photo-etching cycles and the number of relief levels.

FIG. 12 is illustrative of the number of repetition of the aforesaid photoetching process and the number of levels produced. FIG. 12(*a*) is illustrative of how two levels are produced in one single operation. If the aforesaid process is repetitively applied to each of the upper and lower levels of FIG. 12(*a*), there are then four levels produced as depicted in FIG. 12(*b*), indicating that the inventive diffractive optical element with a four-valued phase modulation quantity can be fabricated. If the aforesaid process is repeated three times in all, then there are eight levels produced, indicating that the inventive diffractive optical element with an eight-valued phase modulation quantity can be fabricated. In other words, depending on how many times, n (natural number), photoetching is repeated, there are levels of the n-th power of 2 produced at maximum. After the predetermined number of levels have been obtained in this way, the chromium thin film 52 is wet etched away to obtain a relief pattern die for the diffractive optical element 10 with openings and edges formed on the surface of the quartz substrate 51 at a depth corresponding to the given number of levels.

When it comes to the diffractive optical element 10 of the invention, recalculation is only needed for the reproduction of phase distribution data. All the same, there are just only some extra calculation operations but also unexpected incidents such as sudden contamination or breakdown of the relief pattern die. For fabrication using this type of relief pattern die, therefore, it is preferable to obtain one or a few copies of the first obtained relief pattern die and use such a copy (copies) to fabricate as many fabrication pattern dies as necessary. It is noted that to increase the robustness of the relief pattern die, it is preferable to use a metal-plated relief pattern die obtained by applying plating to the surface of the relief pattern die and stripping the relief pattern die off. It is also noted that the relief pattern die could be fabricated by applying mechanical engraving to a suitable substrate, using a diamond needle or the like.

Figure 13:
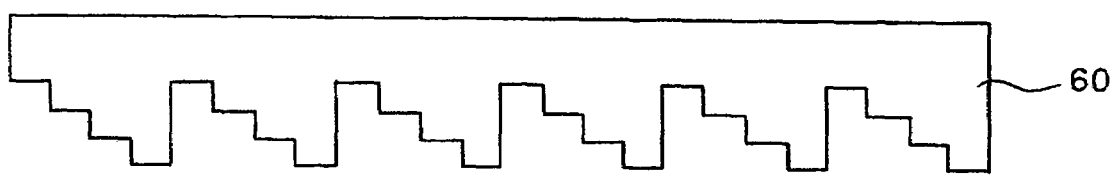
FIG. 13 is illustrative of a relief pattern die and a diffractive optical element copied from it.
Figure 13:
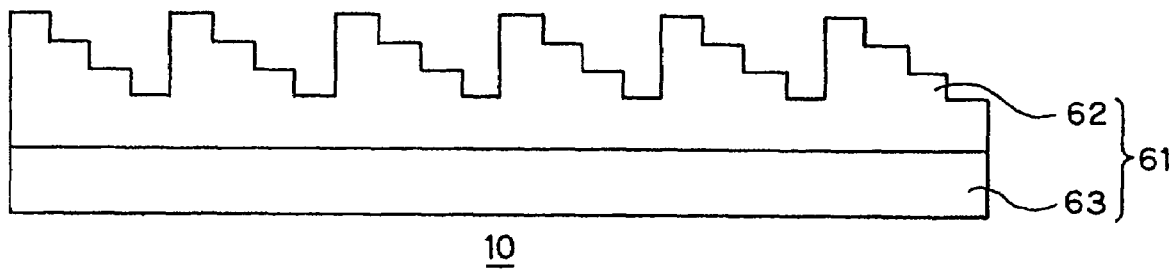
Figure 13:
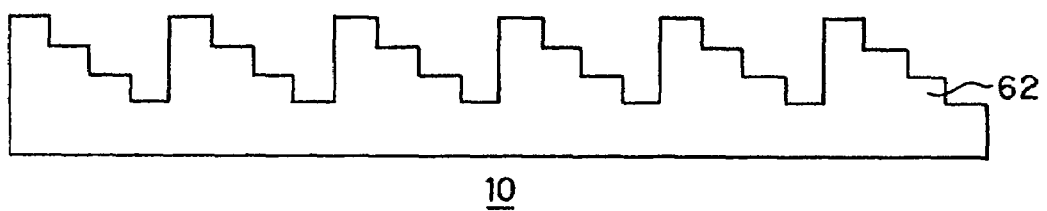

Copying the diffractive optical element 10 using the relief pattern die (preferably, the aforesaid fabrication-purpose pattern die) may be achieved by a process of pressing such a relief pattern die 60 as depicted in FIG. 13($a$) onto a resin layer softened by heating, an injection process or a casting process. Either thermoplastic or thermosetting resins could be used with these processes. For more efficient industrial purposes, while an uncured resin composition preferably containing an ultraviolet curable resin is in contact with the surface of the relief pattern die 60 (the bottom surface of FIG. 13($a$)), a plastic film providing the substrate is laminated on the opposite side of the resin composition. Then, while the resin composition remains sandwiched between the relief pattern die and the plastic film, it is cured by irradiation with ultraviolet or the like, so that a phase modulation layer 62 comprising a cured resin layer to which the relief structure of the surface of the relief pattern die is imparted can be stripped off as a multilayer structure 61 integral with a plastic film 63 (FIG. 13($b$)). This plastic film 63 may optionally be peeled off after the resin composition has been cured.

The ultraviolet curable resin, for instance, includes thermosetting resins such as unsaturated polyester, melamine, epoxy, polyester (meth)acrylates, urethane (meth)acrylates, epoxy (meth)acrylates, polyether (meth)acrylates, polyol (meth)acrylates, melamine (meth)acrylates or triazine-based acrylates, or ionizing radiation curable resins obtained by adding a radical-polymerizable unsaturated monomer to them.

The plastic film 63 that provides the substrate should preferably be of high transparency and smoothness. For instance, use could be made of polyethylene terephthalate films, polyethylene films, polypropylene films, polyvinyl chloride films, acryl films, triacetyl cellulose films, cellulose acetate butyrate films, and polycarbonate films, each having a thickness of 1 µm to 1 mm, and preferably 10 µm to 100 µm.

Just only plastic films but also glass sheets could be used for the substrate.

As described above, if the diffractive optical element is designed to have a four- or eight-valued phase modulation quantity, the optical low-pass filter can be thinner than a quartz crystal one. For instance, the optical low-pass filter can be slimmed down to less than a half (1 mm) the thickness of a quartz crystal optical low-pass filter (that has a thickness of about 2 mm depending on design). If an ultraviolet curing resin is used while a plastic film is used as the substrate, it is then possible to obtain a phase diffraction grating (diffractive optical element) having a thickness of 100 µm or less. If a glass cover or lens is used directly as the substrate without using any plastic film as the substrate, it is then possible to obtain a four- or eight-valued phase diffraction grating having a thickness of 30 µm down to 1 µm.

While the diffractive optical element of the invention and the low-pass filter using the same have been described with reference to the principles and examples, it is understood that the invention is never limited thereto, and could be modified in various ways. For instance, if, in the arrangement of FIG. 9, each of the intermediate areas 41 to 44 is two- or multi-valued, it is then possible to obtain a diffractive optical element with a 16- or multi-valued phase modulation quantity. It is noted that if, while a volume hologram photosensitive material is in close contact with, or in proximity to, the exit side of the diffractive optical element 10 of the invention, replication illumination light is allowed to be incident from the diffractive optical element 10 side for hologram replication, it is then possible to fabricate a volume hologram having the same features as those of the diffractive optical element 10 (in particular, the diffractive optical element capable of splitting incident light into five light beams).

POSSIBLE APPLICATION TO THE INDUSTRY

According to the present invention, a diffractive optical element is allowed to have two-dimensionally a four- or eight-valued phase modulation quantity, thereby reducing unnecessary high-order diffracted light, and improve on the diffraction efficiency of split light beams, or light beams contributing to image formation. As such a diffractive optical element with a four- or eight-valued phase modulation quantity is used as an optical low-pass filter for, e.g., a digital camera, it permits noise light or virtual images superposed on an image to be much more reduced. Further, the present invention makes it possible to achieve an optical low-pass filter that is much more slimmed down than a conventional quartz crystal one.

What is claimed is:

1. A diffractive optical element comprising a transparent substrate, wherein a surface of said transparent substrate is divided into fine rectangular areas of identical shape which line up in two orthogonal directions, wherein, with respect to light incident vertically on the surface of said transparent substrate, an l-th, and a (l+1)-th rectangular area in an l-th row, where l is an odd number, gives a phase $2p\pi$, and a phase $\{(4q+1)\pi/2+\delta\pi/2\}$, respectively, and an l-th, and a (l+1)-th rectangular area in a (l+1)-th row gives a phase $\{(4r+3)\pi/2+3\delta\pi/2\}$, and a phase $\{(4s+2)\pi/2+\delta\pi\}$, respectively, provided that $-0.25 \leq \delta \leq 0.25$, and p, q, r, and s is an integer, characterized in that:

wherein each rectangular area includes one or more intermediate areas adjacent to an adjacent rectangle such that the one or more intermediate areas have phase values that are substantially average of phase value of the rectangular area and the adjacent rectangle, wherein the phase values of the intermediate areas are computed after the phase values of the rectangular area and the adjacent rectangular areas are converted to a value of 0 to $2\pi$ wherein the intermediate areas are shaped like isosceles triangles with a base being equal to a side of the rectangular area and a height being equal to a/L where L is a repetitive pitch of a basic pattern in vertical and horizontal directions of the optical element and a is a variable.

2. The diffractive optical element according to claim 1, characterized in that the rectangular areas before deformed by the intervening intermediate areas comprise square areas.

3. The diffractive optical element according to claim 1, characterized in that a boundary line of each intermediate area comprises a smooth curved line.

4. The diffractive optical element according to claim 3, characterized in that the smooth curved line comprises a sine wave curved line.

5. The diffractive optical element according to claim 1, characterized by being used as a light beam splitter device adapted to split a light beam incident vertically on the transparent substrate into four or five light beams.

6. The diffractive optical element according to claim 1, characterized by being used as an optical low-pass filter adapted to allow mutually displaced identical images to be incident on an imaging plane in a superposed way.

7. A diffractive optical element fabrication process for fabrication of the diffractive optical element according to claim 1, characterized in that n-th power-of-2 levels of relief patterns are formed by photoetching on a substrate, where n is a natural number of 2 or greater, thereby obtaining a relief pattern die, and said relief pattern die is then pressed onto a resin layer to form a relief pattern for a diffractive optical element on a surface of said resin layer.

* * * * *